United States Patent
Yasui

(10) Patent No.: US 7,294,091 B2
(45) Date of Patent: Nov. 13, 2007

(54) TRANSMISSION

(75) Inventor: Yuji Yasui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 197 days.

(21) Appl. No.: 11/273,257

(22) Filed: Nov. 15, 2005

(65) Prior Publication Data

US 2006/0128526 A1    Jun. 15, 2006

(30) Foreign Application Priority Data

Dec. 10, 2004    (JP) .............................. 2004-357946

(51) Int. Cl.
 *B60W 10/00*    (2006.01)
(52) U.S. Cl. ...................................... 477/80
(58) Field of Classification Search ................ 477/79, 477/80; 74/339; 475/207, 153, 154
See application file for complete search history.

(56) References Cited

U.S. PATENT DOCUMENTS

| | | | |
|---|---|---|---|
| 4,517,859 A * | 5/1985 | Nagaoka et al. | 477/143 |
| 4,519,484 A * | 5/1985 | Nagaoka et al. | 192/3.58 |
| 4,544,057 A * | 10/1985 | Webster et al. | 477/86 |
| 4,614,126 A | 9/1986 | Edelen et al. | |
| 4,627,312 A * | 12/1986 | Fujieda et al. | 477/124 |
| 6,895,832 B2 * | 5/2005 | Ishihara et al. | 74/325 |
| 2004/0237949 A1 | 12/2004 | Yasui et al. | |

FOREIGN PATENT DOCUMENTS

| | | |
|---|---|---|
| DE | 102 09 100 A1 | 3/2003 |
| EP | 0 800 125 A1 | 10/1997 |
| EP | 1 150 045 A2 | 10/2001 |
| EP | 1 344 965 A2 | 9/2003 |
| EP | 1 359 048 A2 | 11/2003 |
| WO | 2004/098937 A1 | 11/2004 |

OTHER PUBLICATIONS

Namho Hur et al; A Two-Degrees-of-Freedom Current Control Scheme for Deadtime Compensation; IEE Transactions on Industrial Electronics; vol. 47, No. 3; Jun. 2000; pp. 557-564.

* cited by examiner

*Primary Examiner*—Dirk Wright
(74) *Attorney, Agent, or Firm*—Arent Fox LLP

(57) ABSTRACT

A transmission comprises a first transmission mechanism and a second transmission mechanism. When a clutch is in an engaged state, the first transmission mechanism transmits a driving force from the engine to the axle shaft. When a clutch is in a disengaged state, the second transmission mechanism transmits a driving force from the engine to the axle shaft. An electromagnetic brake is connected to the second transmission mechanism. A braking force generated by the electromagnetic brake allows the transmission of a driving force by the second transmission mechanism. Thus, a driving force is continuously provided even when the clutch is released for a gear change operation.

20 Claims, 18 Drawing Sheets

(a)

(b)

TRANSMISSION

BACKGROUND OF THE INVENTION

The present invention relates to a transmission that transmits a power of an engine to an axle shaft and, in particular to a transmission that can transmit a power of an engine to an axle shaft during a gear change.

At present, an AMT (Automated Manual Transmission) is available. The AMT has better fuel efficiency than an AT (Automatic Transmission) and is easier to operate than a MT (Manual Transmission). The AMT has almost the same structure as the traditional MT. In the AMT, a gear change (gear shift) and a clutch operation are implemented by a hydraulic actuator or an electric actuator in accordance with a signal from an ECU (electronic control unit), instead of a driver. According to the AMT, fuel efficiency can be improved.

Similarly to the MT, the ATM needs to disengage the clutch during a gear change operation. If the clutch is disengaged, a driving force is not transmitted from the engine to the axle shaft. For this reason, smooth drivability like the AT may not be achieved during a gear change operation.

In order to address this problem, a twin-clutch type of AMT having two clutches has been proposed. In the case of the twin-clutch AMT, one clutch is currently engaged. The other clutch is disengaged in preparation for traveling after the next gear change. A shaft of the other clutch is already connected to a gear to be selected in the next gear change. During the gear change operation, the current clutch is disengaged while the other clutch is engaged. Thus, the twin-clutch type AMT reduces the time period during which a driving force is not transmitted to the axle shaft, which implements better drivability like the AT.

However, the twin-clutch type AMT still has a problem that its weight is heavy and its size is large because it needs a complicated mechanism.

There is another approach for compensating for a driving force by using a motor connected to a driving wheel when a clutch is disengaged. However, this approach needs additional devices such as a motor and a battery, which increases the weight and size of the transmission.

Thus, in order to solve the above-described problems, it is an object of the present invention to provide a transmission that can continuously, without interruption, transmit a driving force over a gear change operation and that requires less increase in weight and size.

SUMMARY OF THE INVENTION

According to one aspect of the present invention, a transmission comprises a first transmission mechanism and a second transmission mechanism. When a clutch is in an engaged state, the first transmission mechanism transmits a driving force from the engine to the axle shaft. When a clutch is in a disengaged state, the second transmission mechanism transmits a driving force from the engine to the axle shaft. An electromagnetic brake is connected to the second transmission mechanism. A braking force generated by the electromagnetic brake allows transmission of a driving force by the second transmission mechanism.

Thus, a driving force from the engine can be continuously transmitted to the axle shaft even when a gear change operation is being performed. Because transmission of a driving force is not interrupted, a gear change shock can be reduced.

According to one embodiment of the present invention, the second transmission mechanism includes a planetary gear. The braking force generated by the electromagnetic brake is applied to the planetary gear. In one embodiment, the braking force is applied to a carrier of the planetary gear. The rotation of the carrier is restricted by the braking force. Such application of the braking force can achieve a better gear change control and a better creep travel for a vehicle. Because the electromagnetic brake is resistant to age deterioration, higher reliable gear change operation can be implemented.

According to one embodiment of the present invention, the transmission of a driving force by the second transmission mechanism is performed when a creep travel is required.

Creep travel at an extremely low speed has not been appropriately performed in a conventional manner where the torque transmission is performed by mechanical friction force via the clutch because of variations and/or aging deterioration in products. According to the invention, the electromagnetic braking force can appropriately implement a creep travel.

According to one embodiment of the present invention, the braking force is determined in accordance with at least one of a vehicle speed and a requested driving force. Thus, a driving force can be compensated for during a creep travel or a gear change operation in accordance with a running resistance that depends on the vehicle speed and/or a driver's request for acceleration or deceleration.

According to one embodiment of the present invention, the braking force is controlled by controlling electric current flowing into an electromagnetic coil to a desired value.

Heat is generated in the electromagnetic brake when the braking force is continuously generated. As the temperature of the electromagnet increases, the resistance of the electromagnet increases. A voltage desired for the electromagnet may not be achieved for the electromagnet, which reduces the braking force. Under such a situation, a driving force may not be compensated for during a creep travel or a gear change operation. However, according to the invention, a driving force can be appropriately controlled through the electric current control even when a creep travel or a gear change operation is being performed.

According to one embodiment of the present invention, the control of the electric current is performed by a 2-degree-of-freedom response assignment control. According to this invention, because it can be prevented that the electric current overshoots a desired value, a vibrational behavior of a driving force provided during a creep travel or a gear change operation can be prevented.

According to one embodiment of the present invention, the control of the engagement/disengagement of the clutch is performed by the 2-degree-of-freedom response assignment control. Assignment of a response characteristic to a desired value is the same for both of the control for the electric current and the control for the engagement/disengagement of the clutch. Thus, a deviation of timing between the clutch engagement/disengagement and application of the electric current to the electromagnetic brake can be avoided. Accordingly, it can be prevented that a spike-like behavior appears in a driving force provided during a creep travel and a gear change operation, which implements more smooth drivability.

DESCRIPTION OF THE PREFERRED EMBODIMENTS

1. Structure

Figure 1:
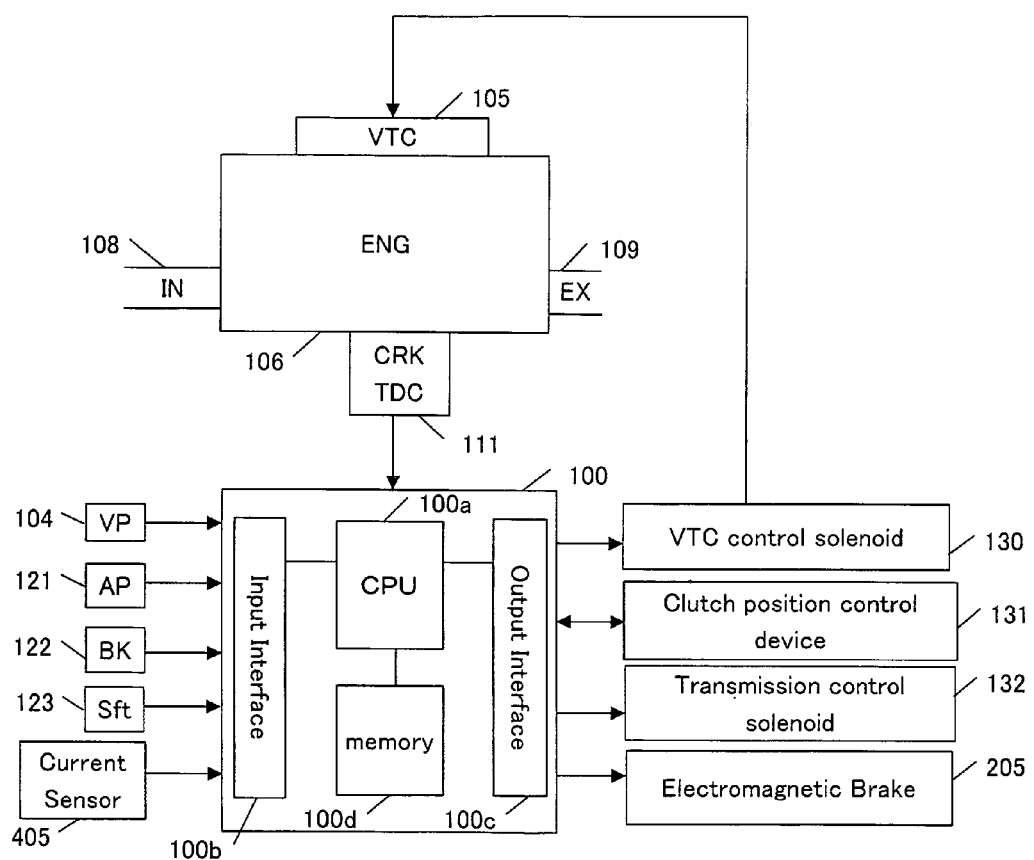
FIG. 1 is a block diagram of an engine and its peripheral devices in accordance with one embodiment of the present invention.

One embodiment of the present invention will be described referring to the accompanying drawings. FIG. 1 is a block diagram showing an improved automated manual transmission, an engine and peripheral devices for a vehicle in accordance with one embodiment of the present invention.

An electronic control unit (hereinafter referred to as an ECU) 100 is essentially a computer and comprises an input interface 100b for receiving data sent from each part of the vehicle, a CPU 100a for carrying out operation for controlling each part of the vehicle, a memory 100d including a read only memory (ROM) and a random access memory (RAM), and an output interface 100c for sending a control signal to each part of the vehicle. One or more programs and data for controlling each part of the vehicle are stored in the ROM. One or more programs for implementing the invention can be stored in the ROM. The ROM may be a rewritable ROM such as an EPROM. The RAM provides work areas for operation by the CPU 100a, in which data sent from each part of the vehicle as well as a control signal to be sent out to each part of the vehicle are temporarily stored.

A signal sent to the ECU 100 is passed to the input interface 100b. The input interface 100b converts an analog signal value into a digital signal value. The CPU 100a processes the resulting digital signal in accordance with a program stored in the memory 1c, and creates a control signal. The output interface 100c sends the control signal to actuators for a VTC control solenoid 130, a clutch position control device 131, a transmission control solenoid 132, an electromagnetic brake 205 and other parts.

In this embodiment, an engine (internal-combustion engine) 101 is a water-cooled 4-cycle gasoline engine. The engine 101 has a known variable valve timing mechanism (VTC) 105. The amount of intake air into the engine is adjusted by changing a lift amount of an intake/exhaust valve and/or an opening/closing timing of the intake/exhaust valve. Control of the intake air amount by this variable valve timing mechanism 105 is implemented, for example, by controlling a solenoid valve of a VTC control solenoid 130 according to a control signal from the ECU 100, selecting one of multiple cams provided for the valve lift operation by an oil pressure, and changing a phase of the cam for opening/closing the valve.

In the embodiment, the intake air amount is adjusted by the variable valve timing mechanism. Alternatively, a drive-by-wire type of throttle valve, which is electrically controlled by the ECU 100, may be used for that adjustment. The throttle valve is a valve for controlling the amount of air flowing into an intake manifold 108. An opening degree of the throttle valve is controlled by a built-in throttle valve motor. The throttle valve motor is used for changing an opening degree of the throttle valve. The valve is fully closed at 0 degree and fully opened at 90 degrees. The ECU 100 supplies an electric power to the throttle valve motor. The motor can operate in accordance with a control signal from the ECU 100.

The intake manifold 108 is provided to introduce air into a cylinder of the engine 101. The exhaust manifold 109 is provided to emit exhaust gas after combustion. A catalyst such as a three-way catalyst (not shown in FIG. 1) is provided to purify the exhaust gas emitted to the atmosphere.

A crank angle sensor 111 is provided in the engine 101 to detect a rotation angle of a crankshaft of the engine 101. The crank angle sensor 111 includes a cylinder distinguishing sensor for outputting a signal pulse (CYL signal pulse) at a predetermined crank angle for each cylinder of the engine 101, a TDC sensor for outputting a TDC signal pulse for the top dead center (TDC) at a start of the intake stroke for each cylinder (namely, every 180 degrees of the crank angle in the case of a 4-cycle engine) and a CRK sensor for generating one pulse every predetermined crank angle (for example, 30 degrees). The CRK signal pulse's cycle is shorter than the TDC signal pulse's cycle. The CYL signal pulse, the TDC signal pulse and the CRK signal pulse are supplied to the ECU 100. These signal pulses are used for various timing controls such as fuel injection timing, ignition timing and so on. They are also used for calculating an engine rotational speed NE.

An accelerator pedal sensor (AP) 121 is attached to an accelerator pedal. The accelerator pedal sensor detects an angle of the accelerator pedal that changes in accordance with a driver's depression. The detected angle is sent to the ECU 100.

A brake depressing force sensor (Bk) 122 is attached to a brake pedal. The brake depressing force sensor detects an angle of the brake pedal that changes in accordance with a driver's depression. The detected angle is sent to the ECU 100.

A shift lever switch (Sft) 123 is attached to a shift lever. The shift lever switch detects a shift position (such as drive range, neutral, reverse and so on). The detected shift position is sent to the ECU 100.

A vehicle speed sensor 104 is attached to an output shaft of the transmission. In this embodiment, the output shaft is a counter shaft 214 described later. A rotor is attached to the output shaft of the transmission to generate a predetermined number of pulse signals per one rotation. The ECU 100 detects those pulse signals and then determines the vehicle speed by multiplying the detected value by a predetermined coefficient.

A clutch position control device 131 controls an electric actuator in accordance with a control signal from the ECU 100. Through the electric actuator, a position of the clutch connected to the electric actuator is controlled. Thus, the control device 131 can control engagement/disengagement of the clutch. In this embodiment, the clutch is released (disengaged) in accordance with a voltage applied to the electric actuator. In order to feed back the clutch position to the ECU 100, the clutch position control device 131 includes a clutch position sensor for detecting the clutch position by detecting a controlled variable of the electric actuator. An output from the clutch position sensor is sent to the ECU 100 through the clutch position control device 131.

A transmission control solenoid 132 is a solenoid for switching between oil hydraulic paths to move a selector toward a desired gear in accordance with a signal from the ECU 100. Thus, switching between gears of a transmission is implemented. Such a gear change operation will be described in detail later.

Figure 2:
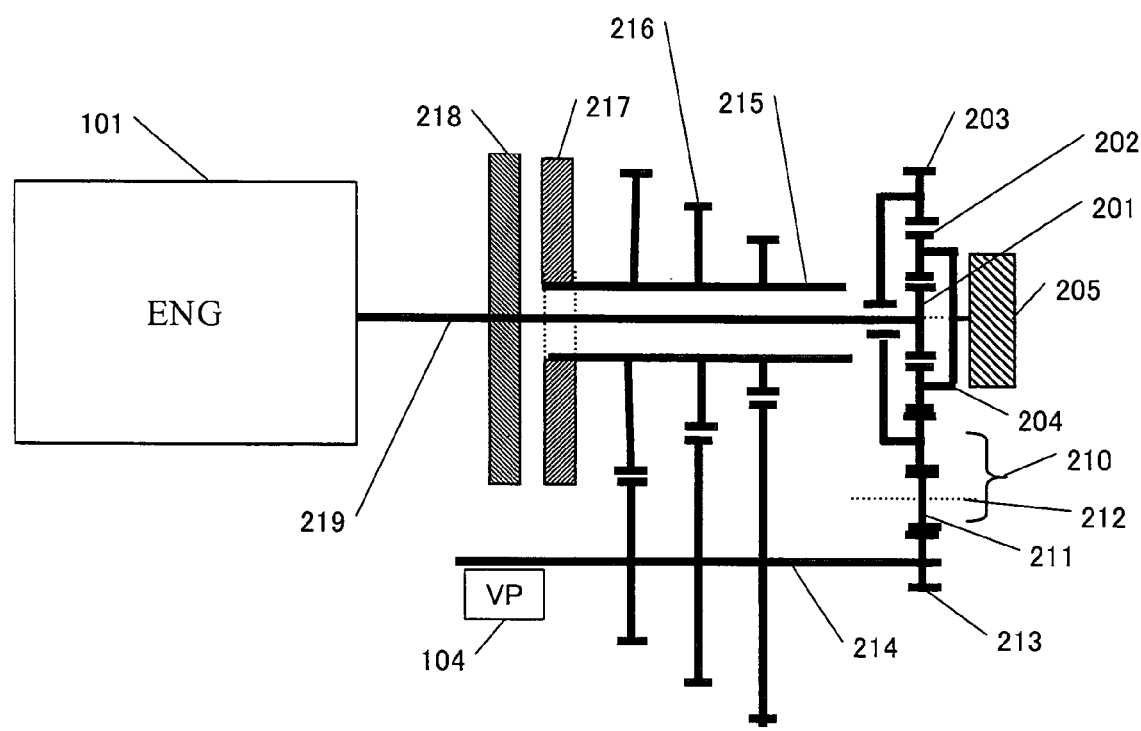
FIG. 2 is a block diagram of a transmission in accordance with one embodiment of the present invention.
Figure 3:
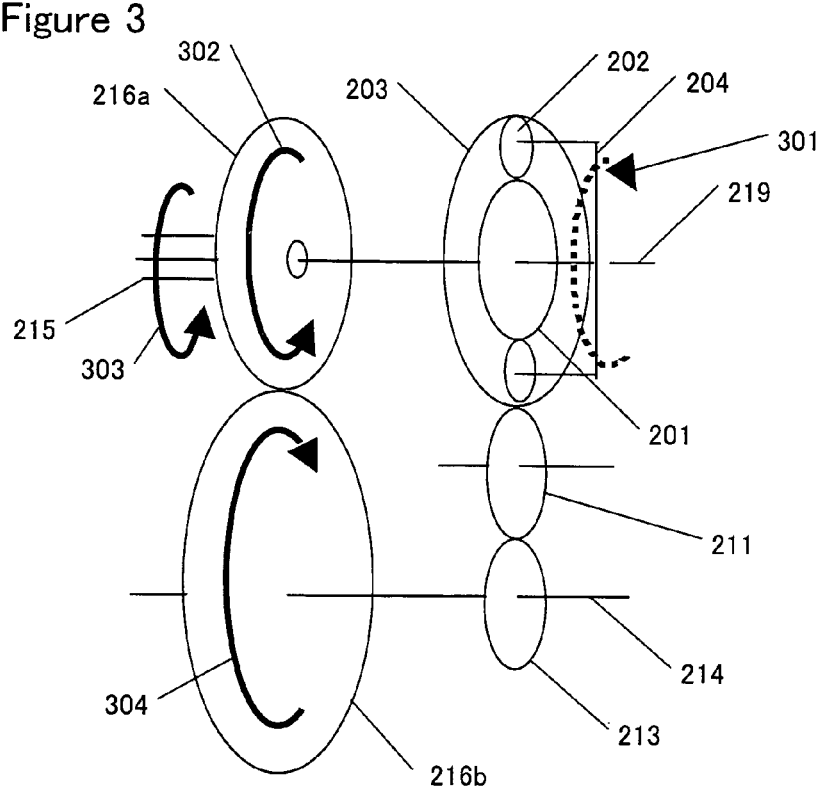
FIG. 3(a) schematically shows transmission of a driving force for a normal travel and FIG. 3(b) schematically shows transmission of a driving force during a gear change, in accordance with one embodiment of the present invention.
Figure 3:
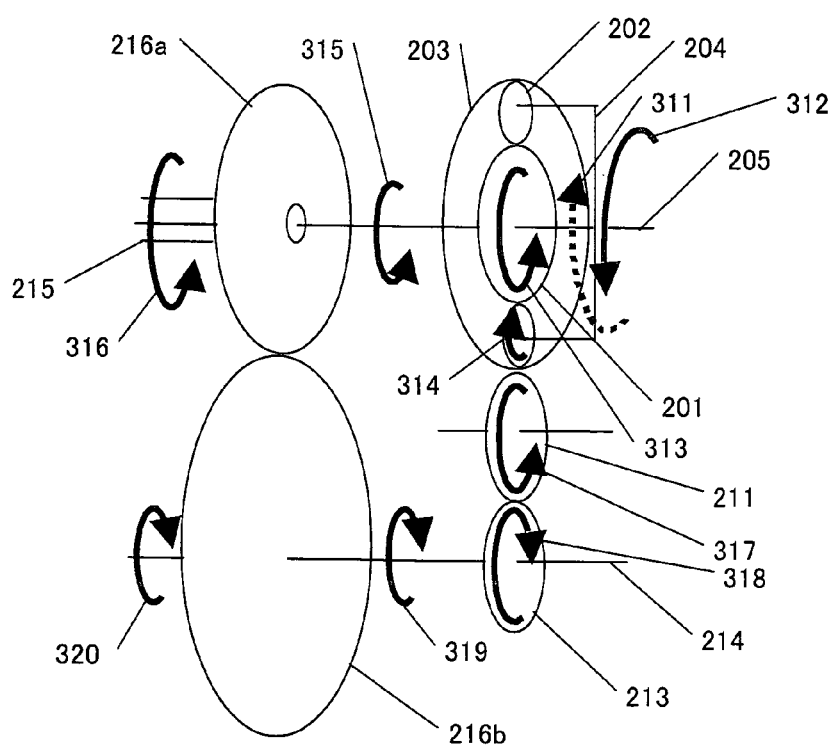

Referring to FIGS. 2 and 3, a transmission in accordance with one embodiment of the present invention will be described. FIG. 2 is a block diagram showing a relationship among an engine, a transmission and an electromagnetic brake in accordance with one embodiment of the present invention.

A clutch is a device for engaging/disengaging transmission of the driving force of the engine to a main shaft 215 by engaging/disengaging a connection between a flywheel 218 that is fixedly attached to a bypass shaft 219 extending from the engine and a disk-shaped friction plate (clutch disk) 217 that is fixedly attached to the main shaft 215. The flywheel 218 and the clutch disk 217 are pressed each other by a coil spring to connect therebetween. The electric actuator (not shown) that is controlled by the clutch position control device 131 as described above is connected to the clutch disk. The clutch can be engaged/disengaged by controlling the clutch position through a control of this electric actuator in accordance with a signal from the ECU 100.

The transmission used in this embodiment is a constant mesh transmission. Therefore, each of the gears 216 is constantly engaged with a corresponding gear on the counter shaft 214. The constant mesh transmission has a synchronization mechanism (synchro-mesh mechanism). Only one gear selected by a selector (not shown) is engaged with the main shaft 215. Movement of the selector is controlled through the oil pressure control by the above-described transmission control solenoid 132. Thus, the selector is moved to a desired gear by the oil hydraulic control in accordance with a control signal from the ECU 100 and the shynchro-mesh mechanism causes the selected gear to be engaged with the main shaft 215. More specifically, a sleeve of the synchro-mesh mechanism is moved to a desired gear and then engaged with the cone of the gear so that rotation synchronization is achieved. Thus, the selected gear is engaged with the main shaft 215 through the sleeve.

A plurality of gears are attached to the main shaft 215. These gears can rotate relatively to the main shaft. Transmission of the engine power is implemented by engaging one of the gears with the main shaft. The engagement of the gear is implemented by moving the sleeve to the gear, as described above. Since the selector is connected to an oil hydraulic control unit that is controlled by the transmission control solenoid 132 and the solenoid 132 is controlled by a signal from the ECU 100, the selector can move to a desired gear.

In one embodiment of the present invention, a planetary gear mechanism includes a sun gear 201, a plurality of planetary pinions 202, a ring gear 203 and a planetary carrier 204.

The sun gear 201 is located in the center of the planetary gear mechanism. In this embodiment, a shaft of the sun gear 201 is fixedly connected to the output shaft (bypass shaft 219) extending from the engine so that the output of the engine is transmitted directly to the sun gear 201.

The planetary pinions 202 are provided between the ring gear 203 and the sun gear 201. For the purpose of simplicity, FIG. 3 shows only two planetary pinions provided between the sun gear 201 and the ring gear 203. The planetary carrier 204 is rotatably connected to the planetary pinions 202 so that the planetary pinions 202 are interconnected.

On an inner surface of the ring gear 203, there are formed gear teeth for engaging with the planetary pinions 202. On an outer surface of the ring gear 203, there are formed gear teeth for transmitting the power to a torque transmitting gear 211.

The power transmission from the sun gear 201 to the ring gear 203 can be controlled by restricting the rotation of the planetary carrier 204. For example, if the rotation of the planetary carrier 24 is not restricted when the sun gear 201 rotates, the rotation of each planetary pinion about its axis and the rotation of the planetary pinions about the sun gear are not restricted. In this situation, the power is not transmitted to the ring gear because the planetary pinions 202 rotate freely inside the ring gear 203. On the other hand, if the rotation of the planetary carrier 204 is restricted when the sun gear 201 rotates, the rotation of the planetary pinions 202 about the sun gear is restricted, but the rotation of each of the planetary pinions 202 about its axis is not restricted. In this case, the power from the sun gear 201 is transmitted to the ring gear 203 through the rotation of the planetary pinions 202.

As a device for restricting the rotation of the planetary carrier 204, an electromagnetic brake (hysteresis brake) 205 is connected to the center axis of the planetary carrier 204.

Figure 4:
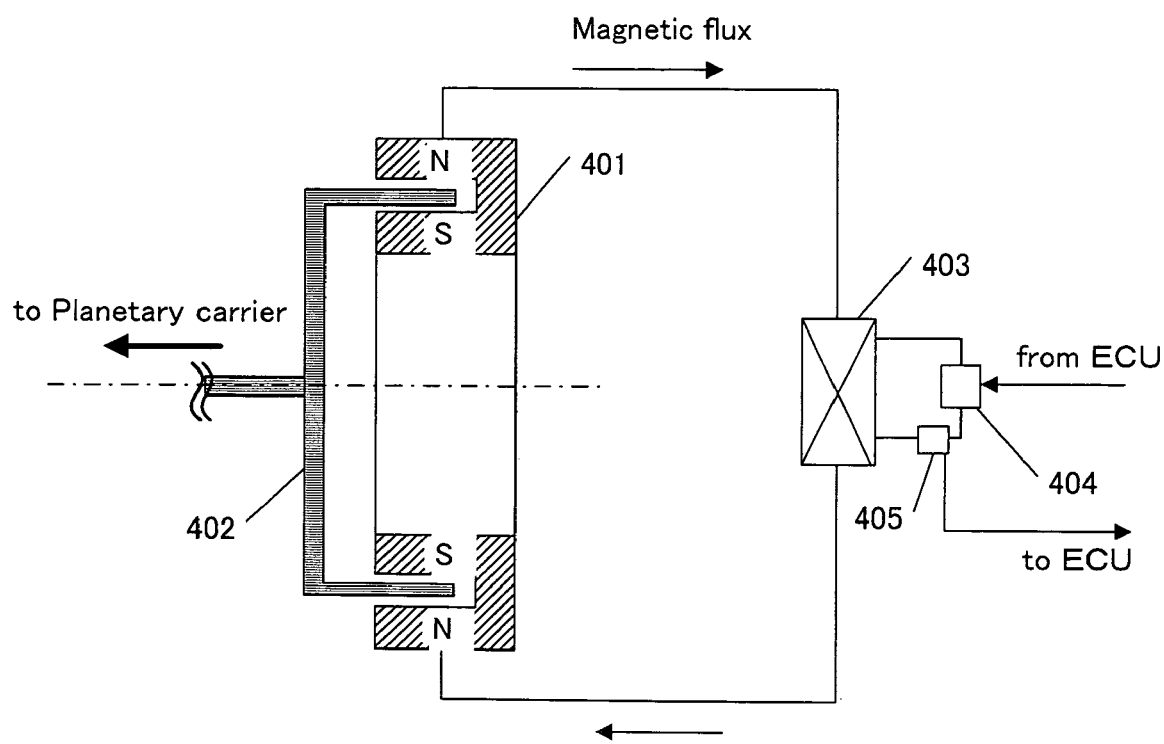
FIG. 4 is a block diagram of an electromagnetic brake in accordance with one embodiment of the present invention.

FIG. 4 is a block diagram of the electromagnetic brake 205 used in one embodiment of the present invention. Electric current is applied to an exciting coil 403 to generate magnetic flux, which flows into an inner/outer yoke 401. A rotation ring 402 is inserted into the yoke 401 without contact with the yoke 401. The magnetic flux which flows into the yoke 401 passes through the rotation ring 402. Magnetic friction is generated between the rotation ring 402 and the yoke 401. The magnetic friction serves as a braking force. Since an axis of the rotation ring 402 is connected to the axis of the planetary carrier 204, the braking force of the magnetic brake 205 serves as a braking force against the planetary carrier 204. Control of the electric current and voltage is carried out by the voltage control device 404 in response to a control signal from the ECU 100. The electromagnetic brake 205 is provided with a current sensor 405 for measuring the applied electric current, which is used for a braking force control (described later).

The braking force of the magnetic brake 205 is almost in proportion to the magnitude of the electric current applied to the electromagnetic coil. Thus, the braking force can be adjusted independently of the rotational speed of the rotation ring 402.

According to one embodiment of the present invention, a bypass shaft 219 is connected to the output shaft of the engine 101. The bypass shaft 219 is a shaft for constantly transmitting the output of the engine 101. As described above, the sun gear is attached to an end portion of this bypass shaft 219. A torque transmission gear 211 engages with the gear on the outer surface of the ring gear 203 to transmit the power to the counter shaft 214.

The counter shaft 214 is a shaft for transmitting to vehicle wheels the power through the gear 216 or the power through the planetary gear mechanism. The counter shaft 214 is provided with a counter shaft gear 213 for transmitting the power from the torque transmission gear 211. The counter shaft 214 transmits the power to the vehicle wheels through a propeller shaft and a differential gear (these are not shown in the figures).

2. Power Transmission

Now, referring to FIG. 3, a power transmission path from the engine 101 to the counter shaft 214 will be described.

FIG. 3(a) shows a transmission path of the power when the power is transmitted through the clutch and the selected gear 216. In one embodiment of the present invention, during a normal travel, a sleeve is moved to a desired gear 216 and the power is transmitted via the selected gear, as described above. The braking force by the magnetic brake 205 is not generated. Therefore, the planetary pinions 202 rotate freely inside of the ring gear 203. The torque transmission from the bypass shaft 219 to the counter shaft 214 is not carried out.

As shown in FIG. 3(a), a transmission path is established so that the power is transmitted through the clutch and the selected gear 216a. The power from the engine 101 is transmitted to the main shaft 215 as shown by an arrow 303. This power is further transmitted through the gear 216a and the gear 216b as shown by an arrow 302 and an arrow 304. Then, this power is eventually output to the counter shaft 214.

FIG. 3(b) shows a transmission path of the power when the power is transmitted through the planetary gear mechanism. During a gear change operation, the power is not transmitted via the gears 216a and 216b because the clutch is disengaged and the sleeve, which has been engaged with the main shaft 215, is also released. The braking force is generated by the electromagnetic brake 205 to limit a differential rotation by the planetary carrier 204. In accordance with the magnitude of the braking force, the power is transmitted from the bypass shaft 219 to the counter shaft 214. If the planetary carrier is completely braked by the electromagnetic brake 205, all torque of the bypass shaft 219 is transmitted to the counter shaft. The power from the engine is not transmitted to the main shaft 215 because the clutch is disengaged. However, the power is transmitted through the bypass shaft 219 (arrow 315). Because the planetary carrier 204 is stopped by the magnetic brake 205, the power from the bypass shaft 219 is transmitted through the sun gear 201 and the planetary pinions 202 (arrow 314) and then transmitted to the torque transmission gear 211 through the ring gear 203 (arrow 317). The power thus transmitted to the torque transmission gear 211 is eventually transmitted to the counter shaft 214 through the counter shaft gear 213 (arrow 318).

Thus, even when the clutch is in a released state during a gear change operation and hence the power is not transmitted to the counter shaft 214 through the power transmission path via the clutch, the engine power can be transmitted to the counter shaft 214 through the planetary gear mechanism. As a result, a reduction in drivability during a gear change operation, which is caused by the interruption of the power transmission in response to a release of the clutch, can be prevented.

In this embodiment, the sun gear 201 is connected to the bypass shaft 219, the planetary carrier 204 is connected to the electromagnetic brake 205, and the ring gear 203 is connected to the torque transmission gear 211 for transmitting the power to the counter shaft 214. However, the present invention is not limited to such a structure. In other words, it can be arbitrarily defined which of the sun gear 201, the planetary carrier 204 and the ring gear 203 is connected to which of the engine 101, the torque transmission gear 211 and the magnetic brake 205. For example, the sun gear 201 may be connected to the counter shaft and the power from the engine 101 may be transmitted to the ring gear 203.

Figure 5:
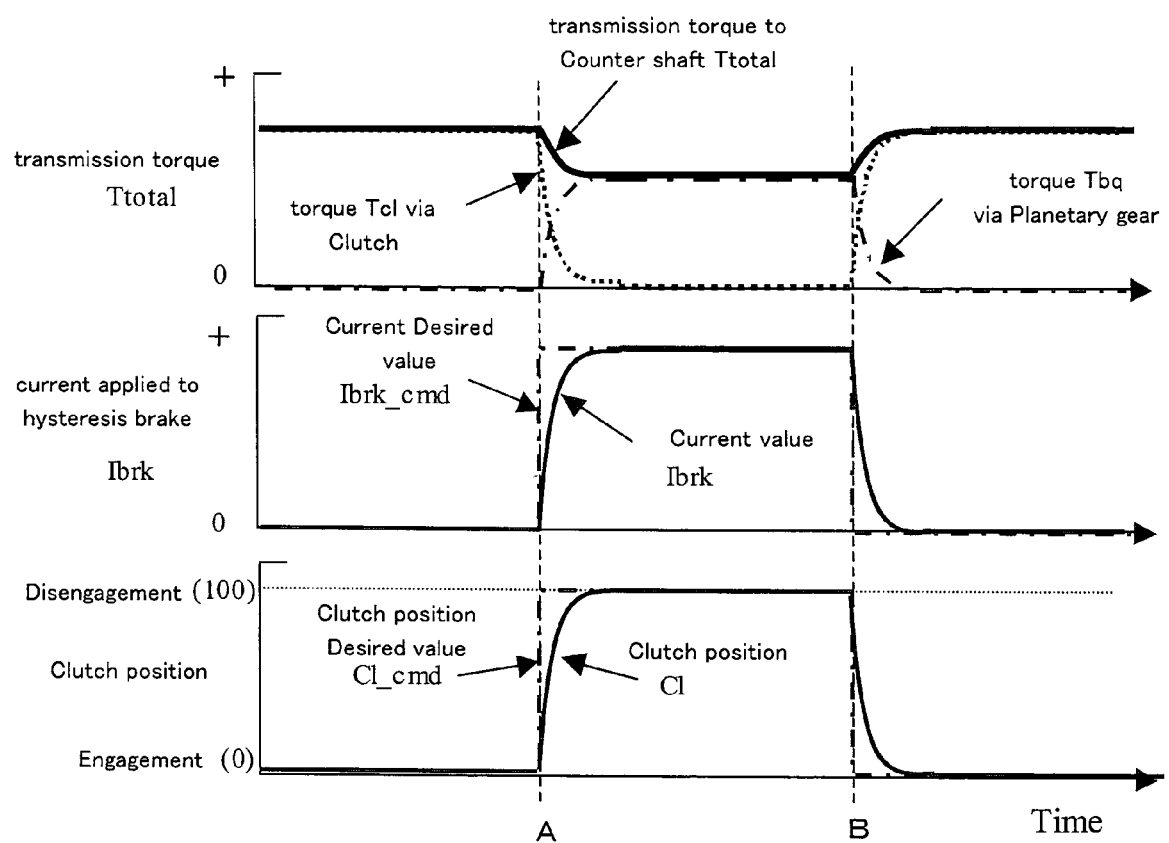
FIG. 5 is a graph showing behavior of a transmission torque when a gear change is performed in accordance with one embodiment of the present invention.

FIG. 5 is a graph showing engagement/disengagement of the clutch, an electric current applied to the electromagnetic brake, and a torque transmitted through the planetary gear mechanism. A period until the time "A" indicates a normal travel state in which the clutch is in an engaged state and the power is transmitted through a selected gear. A period from the time "A" to "B" indicates a state in which the clutch is disengaged and a gear change operation is being carried out. A period from the time "B" indicates a state in which the clutch is again engaged after the completion of the gear change.

During the period until the time "A", a clutch position Cl represents 0 (engagement) because the clutch is in an engaged state and the electric current value of the electromagnetic brake 205 also indicates 0 because the brake is not activated. Accordingly, the torque Tbp via the planetary gear mechanism indicates 0 because the power is not transmitted through the planetary gear mechanism. On the other hand, the torque Tcl is transmitted via the clutch because the clutch is in an engaged state and the torque from the engine 101 is transmitted to the counter shaft 214 through the selected gear. The transmission torque Ttotal to the counter shaft 214 is equal to the value of the torque Tcl via the clutch.

During the period from "A" to "B", a gear change is performed. The value of the clutch position Cl becomes 100 (release) because the clutch is disengaged. In order to prevent the power transmission to the counter shaft 214 from being lost due to the disengagement of the clutch, electric current is applied to the electromagnetic brake 205. When the electric current is applied to the electromagnetic brake, the torque transmission through the planetary gear mechanism is started. Accordingly, the torque Tcl via the clutch becomes 0 whereas the transmission of the torque of Tbq is performed through the planetary gear mechanism. The transmission torque Ttotal to the counter shaft is equal to the value of the torque Tbp. The gear change is performed while the clutch is in a disengaged state.

After the gear change is completed, the clutch is engaged again at the time "B". Therefore, the clutch position Cl becomes 0 and the electric current applied to the electromagnetic brake is controlled to 0. The torque Tbp through the planetary gear mechanism becomes 0 because the power is not transmitted through the planetary gear mechanism. In contrast, the transmission of the torque Tcl via the clutch is performed because the clutch is engaged and the torque transmission from the engine to the counter shaft is performed through a gear selected in the gear change operation. The transmission torque Ttotal to the counter shaft is equal to the torque Tcl.

3. Control of the Clutch Position and the Electromagnetic Brake

In one embodiment of the present invention, the power can be transmitted to the counter shaft 204 through the planetary gear mechanism braked by the electromagnetic brake 205 so that transmission of the output of the engine 101 to the counter shaft is not interrupted even when the clutch is disengaged because of a gear change operation.

Figure 6:
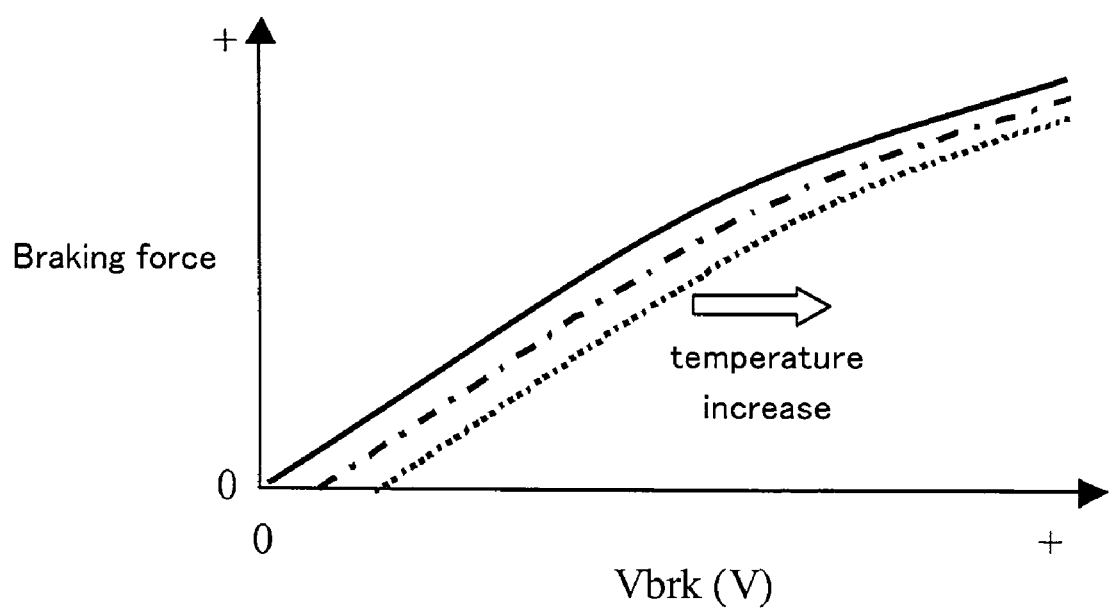
FIG. 6 is a graph showing change in a braking force due to a temperature of an electromagnetic brake in accordance with one embodiment of the present invention.
Figure 7:
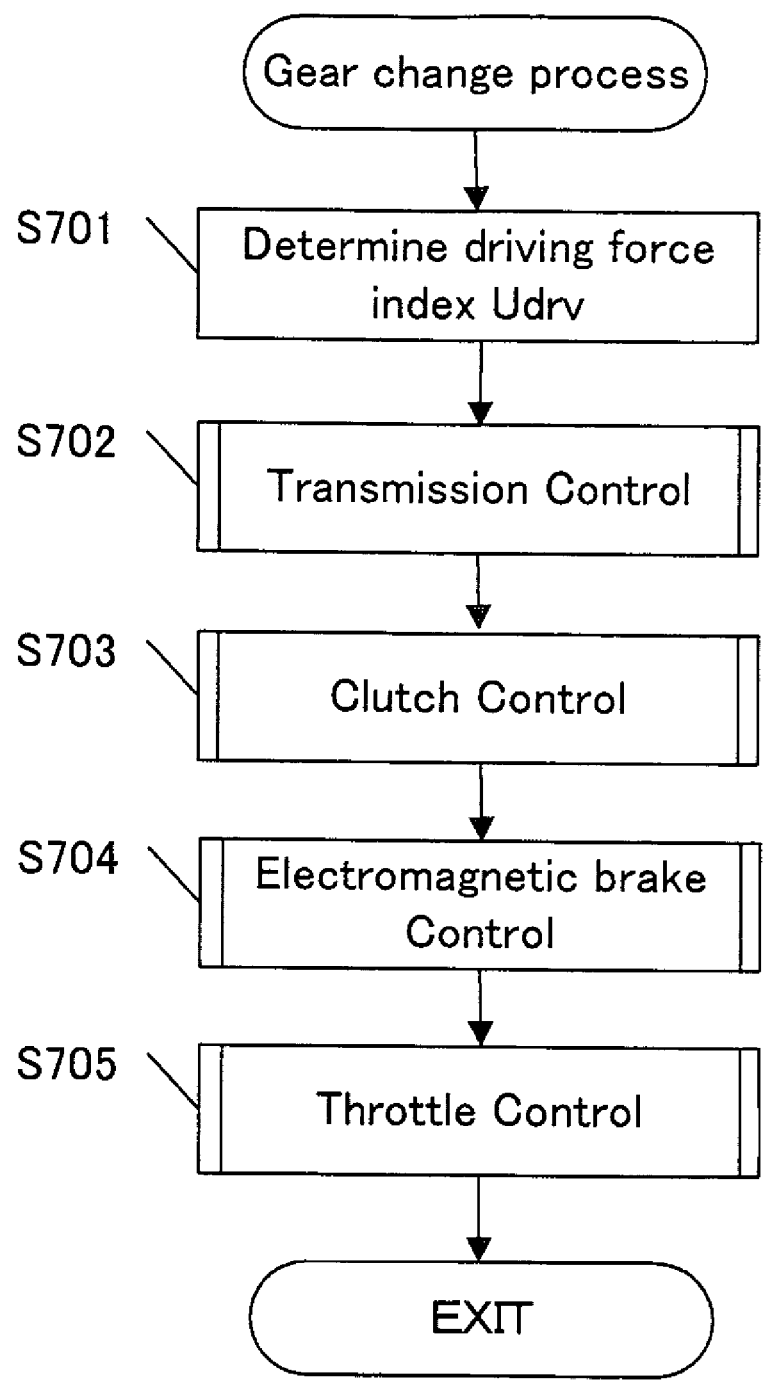
FIG. 7 is a flowchart of a gear change process in accordance with one embodiment of the present invention.

The transmission torque Tbp through the planetary gear mechanism when the clutch is in a disengaged state according to one embodiment of the present invention changes in accordance with a braking force generated by the electromagnetic brake 205. The braking force of the electromagnetic brake is adjusted so as to be synchronized with a behavior (engagement/disengagement) of the clutch. In other words, the braking force is adjusted to be synchronized with a behavior of the clutch position Cl that follows a desired value Cl_cmd. During this adjustment, the braking force is controlled by the voltage Vbrk applied to the electromagnet of the electromagnetic brake. However, when the temperature of the electromagnet increases due to continuous activation of the electromagnetic brake, the resistance of the electromagnetic coil increases, which decreases the electric current Ibrk. If the electric current decreases, the electromagnetic force decreases, thereby reducing the braking force. FIG. 6 is a graph showing the braking force with respect to the applied voltage. It is seen that the braking force relative to the applied voltage decreases as the temperature increases.

Thus, even if the voltage Vbrk is controlled by a feedforward control, the braking force with respect to the applied voltage cannot become constant. As a result, a desired transmission torque Tbp may not be achieved.

The electromagnetic force or the braking force is almost proportional to Ibrk. In order to achieve the desired transmission torque Tbp, an electric current sensor 405 is provided to detect the electric current. Vbrk is determined so that the detected current value Ibrk reaches a desired current value Ibrk_cmd.

In order to achieve an exponential behavior of the transmission torque Ttotal (such behavior implements a better drivability during a gear change operation as shown in FIG. 5), the clutch position control and the electric current control for the electromagnetic brake are performed by using a 2-degree-of-freedom response assignment control.

The 2-degree-of-freedom response assignment control can achieve a quick response of the controlled object while suppressing vibrational behavior of the controlled object.

The response assignment control uses a desired value response assignment parameter POLE_f to apply a first-order delay filter (low-pass filter) to a desired value Cl_cmd_f as shown by the equation (1-1). The desired value response assignment parameter POLE_f defines a speed that the controlled variable follows a desired value. It is set to satisfy −1<POLE_f<0.

$$Cl\_cmd\_f(k) = -POLE\_f \cdot Cl\_cmd\_f(k-1) + (1+POLE\_f)Cl\_cmd(k) \quad (1\text{-}1)$$

As shown in the equation (1-1), the value of the parameter POLE_f specifies a trajectory of the desired value Cl_cmd_f. Because the first-order delay filter is used, the trajectory thus defined enables the clutch position Cl to gradually converge to the desired value Cl_cmd(k). According to what trajectory of the desired value is established, a speed that the controlled variable follows the desired value can be controlled.

A switching function σ_cl is defined as shown by the equation (1-2). e_cl represents an error between the clutch position Cl and the desired value Cl_cmd_f. The switching function σ_cl specifies a convergence behavior of the error e_cl. POLE_cl is a disturbance suppression assignment parameter for suppressing a disturbance and specifies a speed that the error e_c converges to zero when a disturbance is applied. The disturbance suppression assignment parameter POLE_cl is set to satisfy −1<POLE_cl<0.

$$\sigma\_cl(k) = e\_cl(k) + POLE\_cl \cdot e\_cl(k-1)$$

where $e\_cl(k) = Cl(k) - Cl\_cmd\_f(k)$ \quad (1-2)

A reaching law input Vrch_cl and an adaptive law input Vadp_cl are calculated in accordance with the equations (1-3) and (1-4). Vrch_cl is an input for placing a state quantity on a switching line. Here, the switching line is defined by the switching function. The state quantity is represented by (e_cl(k−1), e_cl(k)). Krch_cl and Kadp_cl indicate feedback gains. The values of the feedback gains Krch_cl and Kadp_cl are predetermined through a simulation or the like taking into account the stability, quick responsiveness etc. of the controlled variable.

$$Vrch\_cl(k) = Krch\_cl \cdot \sigma\_cl(k) \quad (1\text{-}3)$$

$$Vadp\_cl(k) = Kadp\_cl \Sigma_{i=0}^{k} \sigma\_cl(i) \quad (1\text{-}4)$$

Next, a control input Vcl is calculated as a sum of the reaching law input Vrch_cl and the adaptive law input Vadp_cl as shown by the equation (1-5). Thus, the control input (voltage) Vcl is applied to the electric actuator of the clutch position control device 131.

$$Vcl(k) = Vrch\_cl(k) + Vadp\_cl(k) \quad (1\text{-}5)$$

The above 2-degree-of-freedom response assignment control is implemented by the ECU 100 calculating the above-described equations.

Furthermore, in the embodiment of the present invention, the electric current control for the electromagnetic brake is also controlled by using a 2-degree-of-freedom response assignment control.

A desired value response assignment parameter POLE_f is used to apply a first-order delay filter (low-pass filter) to a desired value Ibrk_cmd_f as shown by the equation (2-1). The desired value response assignment parameter POLE_f defines a speed that the controlled variable follows a desired value. It is set to satisfy −1<POLE_f<0.

$$Ibrk\_cmd\_f(k) = -POLE\_f \cdot Ibrk\_cmd\_f(k-1) + (1+POLE\_f)Ibrk\_cmd(k) \quad (2\text{-}1)$$

As shown by the equation (2-1), the value of the parameter POLE_f specifies a trajectory of the desired value Ibrak_cmd_f. Because the first-order delay filter is used, the trajectory thus defined enables the electric current value to converge to the desired value Ibrak_cmd(k). According to what trajectory of the desired value is established, the speed that the controlled variable follows the desired value can be controlled.

A switching function σ_brk is defined as shown by the equation (2-2). e_brk represents an error between the brake electric current value Ibrk and the desired value Ibrk_cmd_f. The switching function σ_brk specifies a convergence behavior of the error e_brk. POLE_brk is a disturbance suppression assignment parameter for suppressing a disturbance and specifies a speed that the error e_brk converges to zero when a disturbance is applied. The disturbance suppression assignment parameter POLE_brk is set to satisfy −1<POLE_brk<0.

$$\sigma\_brk(k)=e\_brk(k)+POLE\_brk \cdot e\_brk(k-1)$$

where $e\_brk(k)=Ibrk(k)-Ibrk\_cmd\_f(k)$ (2-2)

A reaching law input Vrch_brk and an adaptive law input Vadp_brk are calculated in accordance with the equations (2-3) and (2-4). Vrch_brk is an input for placing a state quantity on a switching line. Here, the switching line is defined by the switching function. The state quantity is represented by (e_brk(k−1), e_brk(k)). Krch_brk and Kadp_brk indicate feedback gains. The values of the feedback gains Krch_brk and Kadp_brk are predetermined through a simulation or the like taking into account the stability, quick responsiveness etc. of the controlled variable.

$$Vrch\_brk(k)=Krch\_brk \cdot \sigma\_brk(k) \quad (2\text{-}3)$$

$$Vadp\_brk(k) = Kadp\_brk \sum_{i=0}^{k} \sigma\_brk(i) \quad (2\text{-}4)$$

Next, a control input Vbrk is calculated as a sum of the reaching law input Vrch_brk and the adaptive law input Vadp_brk as shown by the equation (2-5). Then, the control input (voltage) Vbrk is applied to the coil of the electromagnetic brake.

$$Vbrk(k)=Vrch\_brk(k)+Vadp\_brk(k) \quad (2\text{-}5)$$

The above 2-degree-of-freedom response assignment control is implemented by the ECU 100 calculating the above equations.

A spike-like behavior or a vibrational behavior may appear in the Ttotal due to a timing deviation between the clutch position control and the electric current control. In order to avoid appearance of such behaviors, it is preferable that the same desired value response assignment parameter POLE_f is used for both of the clutch position control and the electromagnetic brake current control.

A spike-like behavior of Ttotal may be prevented by establishing a desired value in a ramp form, instead of by using the 2-degree-of-freedom control. However, the engagement position (slip condition) of the clutch may vary due to variations and age deterioration in products. If a desired value in a ramp form is used under such a situation, Ttotal has a tendency to exhibit a vibrational behavior, compared with the 2-degree-of-freedom control. According to the 2-degree-of-freedom control, because a response to a desired value is exponential, such a spike-like behavior can be avoided.

4. Gear Change Process

Now, referring to FIG. 7 through FIG. 18, a gear change of a transmission in one embodiment of the present invention will be described.

After a gear change process is invoked from a main program, the ECU 100 calculates a driving force index Udrv (S701). The driving force index Udrv indicates whether the vehicle is being accelerating or decelerating. According to one embodiment of the present invention, the power from the engine is transmitted to the counter shaft 214 even when the clutch is in a disengaged state. Therefore, the transmitted power when the clutch is in a disengaged state is controlled depending on whether the vehicle is being accelerating or decelerating. This driving force index Udrv is calculated by the equation (3-1).

$$Udrv=AP-Kbk \times BK \quad (3\text{-}1)$$

In the equation (3-1), AP indicates an accelerator pedal opening degree, BK indicates a brake depressing force and Kbk is a conversion coefficient. The accelerator pedal opening degree AP can be obtained from an output of the accelerator pedal sensor AP 121. The brake depressing force BK is obtained from an output of the brake-depressing force sensor 122. The conversion coefficient Kbk is a coefficient used for converting the brake depressing force to the accelerator pedal opening degree. An appropriate value for this coefficient is predetermined.

Next, the ECU 100 invokes and executes a transmission control (S702), a clutch control (S703), an electromagnetic brake control (S704) and an electronic throttle control (S705) (each of these controls will be described below).

At first, the transmission control process (FIG. 8) is invoked. The transmission control process determines a desired gear selection value NGEAR_CMD based on the driving force index and the vehicle speed.

Figure 8:
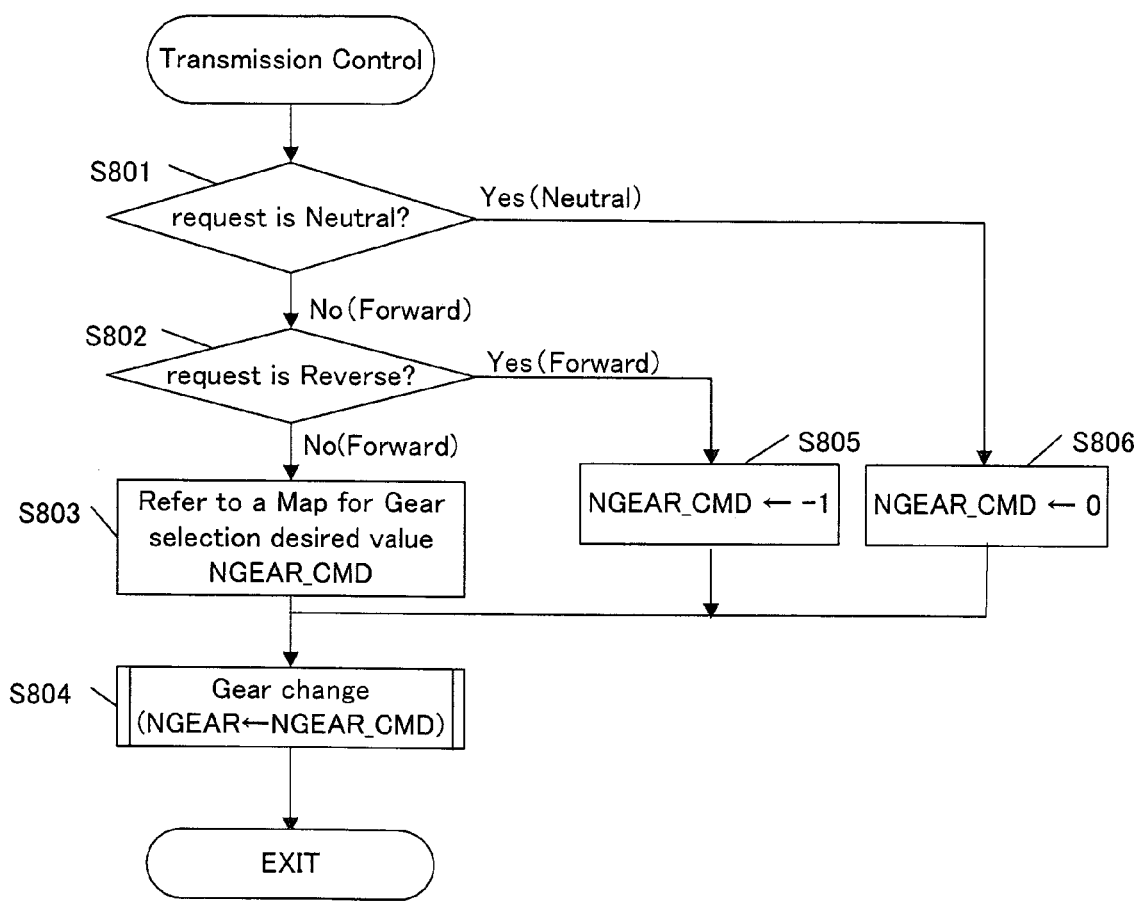
FIG. 8 is a flowchart of a transmission control process in accordance with one embodiment of the present invention.
Figure 9:
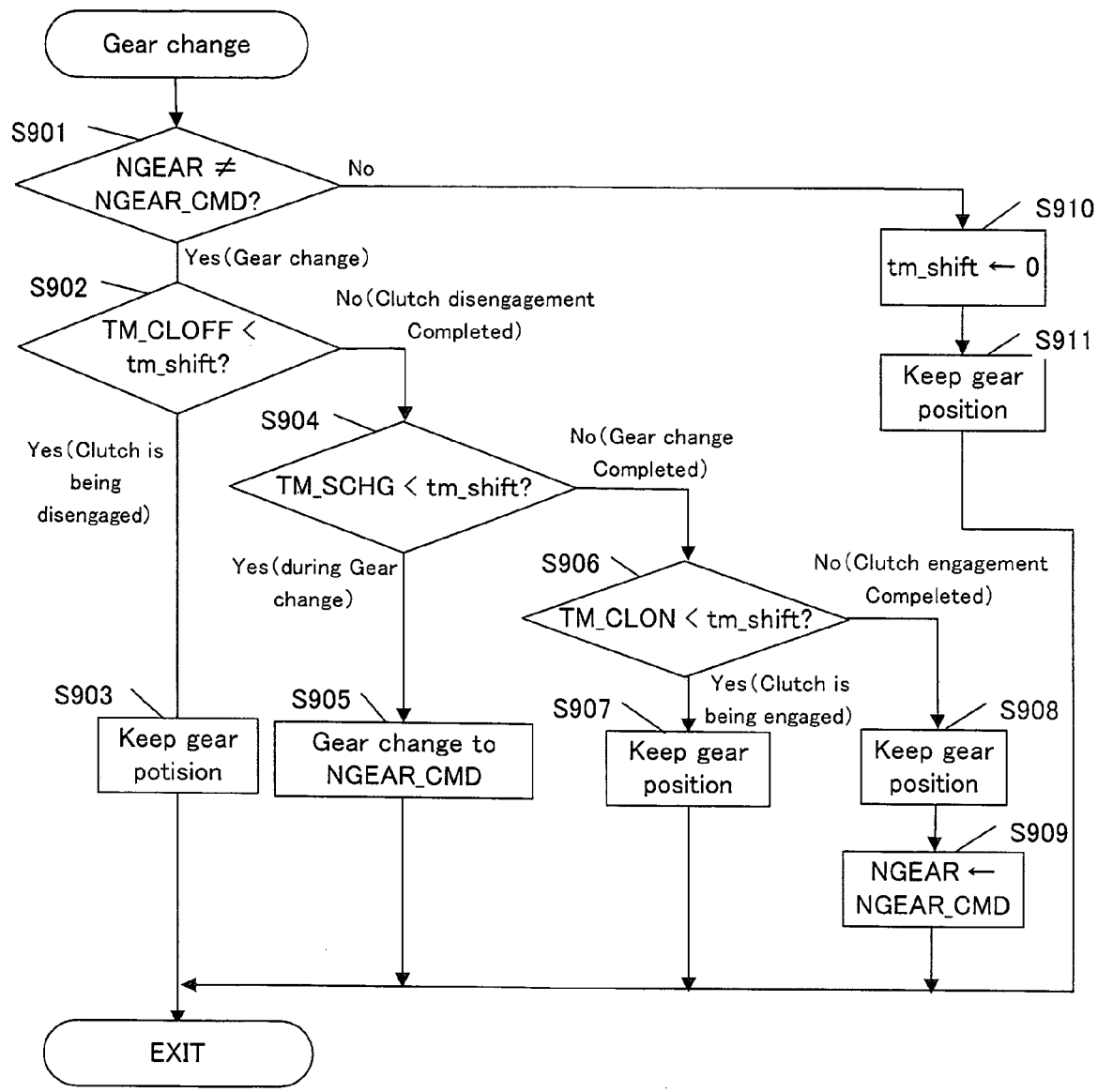
FIG. 9 is a flowchart of a gear change process in accordance with one embodiment of the present invention.

When the transmission control is invoked, the ECU 100 performs the transmission control process shown in FIG. 8. The ECU 100 refers to a value of the shift lever switch 123 to determine whether or not the value indicates a neutral position (S801). If it indicates the neutral position, the ECU 100 sets the desired gear selection value NGEAR_CMD to a value of 0 (zero) (S806).

After the desired gear selection value NGEAR_CMD is set to 0, the ECU 100 sets the desired value NGEAR_CMD in a gear selection value NGEAR. Then, this process terminates.

If the value of the shift lever switch does not indicate the neutral position in step S801 (namely, when the value is not 0), the ECU 100 refers to the value of the shift lever switch to determine whether or not the value indicates a reverse position (namely, the value is −1). If it indicates the reverse position, the ECU 100 sets the desired gear selection value NGEAR_CMD to a value of −1 (S805) and sets the desired value NGEAR_CMD in the gear selection value NGEAR (S804).

In this embodiment, the desired gear selection value NGEAR_CMD is set to 0 for the neutral position, 1 for the first gear position, 2 for the second gear position, 3 for the third gear position, 4 for the fourth gear position, 5 for the fifth gear position and −1 for the reverse position.

In step S802, if the reverse position is not requested, the ECU 100 refers to a desired gear selection value map (FIG. 13) based on the driving force index Udrv and the vehicle speed VP to determine the desired gear selection value NGEAR_CMD (S803).

In step S804, the gear change process (FIG. 9) is invoked so as to switch to a gear indicated by the desired gear selection value.

The gear change process is a process for selecting a gear indicated by the desired gear selection value NGEAS-R_CMD determined in the transmission control process.

The ECU 100 determines whether or not the gear selection value NGEAR is different from the desired gear selection value NGEAR_CMD (S901). The gear selection value NGEAR is a variable stored in a memory and indicates which of the gears is currently used for the transmission of a driving fore. If the gear selection value NGEAR is equal to the desired gear selection value NGEAR_CMD, the gear change is not required. In this case, the ECU 100 sets a gear change reference timer tm_shift, which is an up-timer, to 0 (S910). Then, the gear position remains unchanged (S911).

In step S901, if the gear selection value NGEAR is different from the desired gear selection value NGEAR_CMD, the ECU 100 determines whether or not the gear change reference timer tm_shift is greater than a clutch-off period TM_CLOFF (200 milliseconds (ms) in this embodiment). If the gear change reference timer tm_shift is greater than a clutch-off period TM_CLOFF, it indicates that the clutch is being released. Because the gear change is not performed, the gear position remains unchanged (S903).

In step S902, when the gear change reference timer tm_shift is not greater than the clutch-off period TM_CLOFF, it indicates that a release (disengagement) of the clutch is completed. The ECU 100 determines whether or not the gear change reference timer tm_shift is greater than a gear change period TM_SCHG (600 ms in this embodiment). If the gear change reference timer tm_shift is greater than the gear change period TM_SCHG, it indicates that a gear change operation is allowed. The ECU100 sends a signal to the transmission control solenoid 132 to change from the currently selected gear to a gear indicated by the value of NGEAR_CMD (S905).

In step S904, if the gear change reference timer tm_shift is not greater than the gear change period TM_SCHG, it indicates that the gear change period has elapsed. The ECU 100 determines whether or not the gear change reference timer tm_shift is greater than a clutch-on period TM_CLON (800 ms in this embodiment). If the gear change reference timer tm_shift is greater than the clutch-on period TM_CLON, it indicates the clutch is being engaged. Because the gear change is not performed, the current gear position remains unchanged (S907). If the gear change reference timer tm_shift is not greater than the clutch-on period TM_CLON, the gear change operation is not performed and the current gear position remains unchanged (S908). The ECU 100 sets the desired gear selection value NGEAR_CMD in the gear selection value NGEAR (S909). Then, this process is terminated.

If the gear change process is terminated, the gear change is completed (S804) and hence the transmission control (FIG. 8) is terminated.

Figure 10:
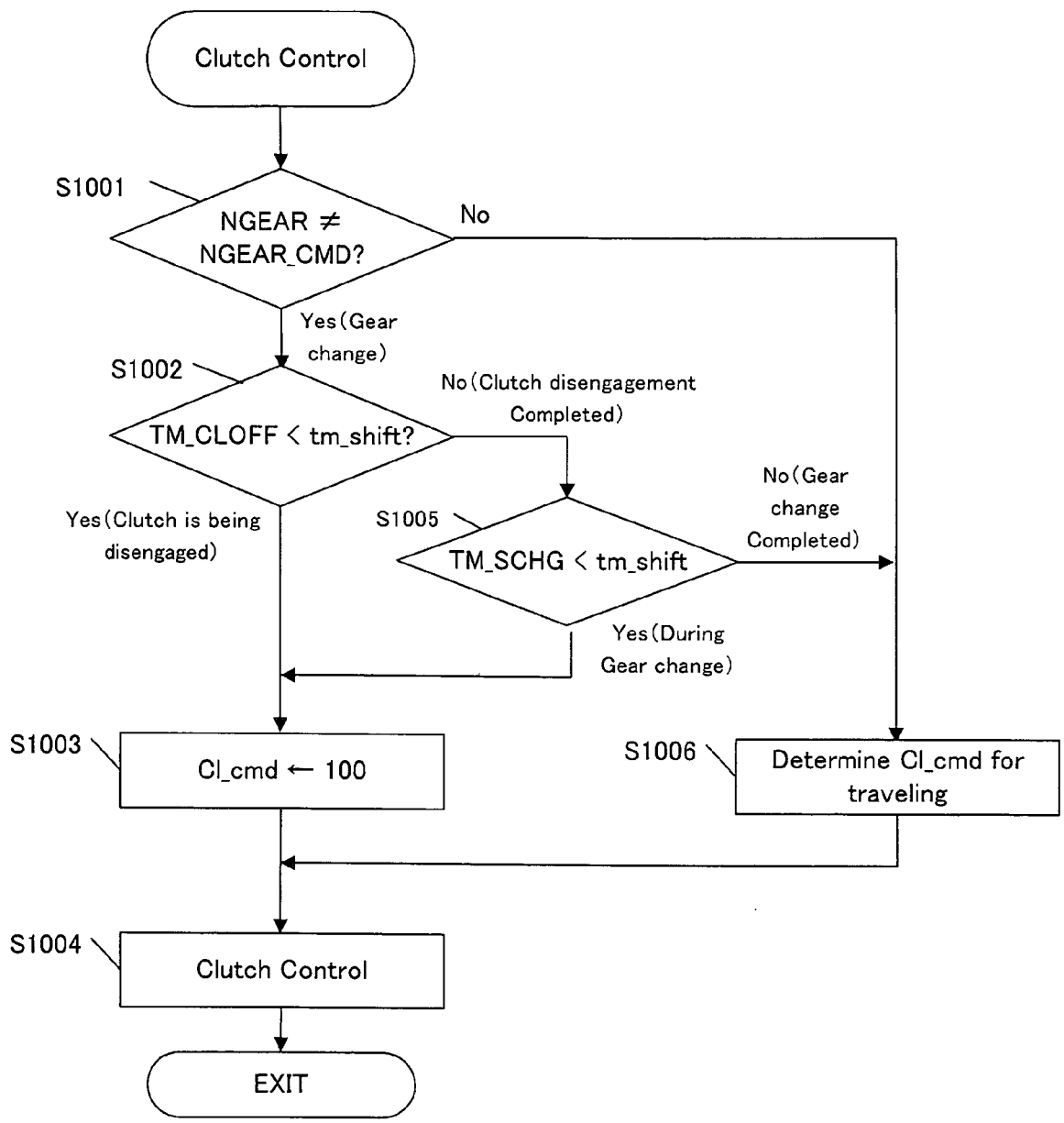
FIG. 10 is a flowchart of a clutch control process in accordance with one embodiment of the present invention.
Figure 11:
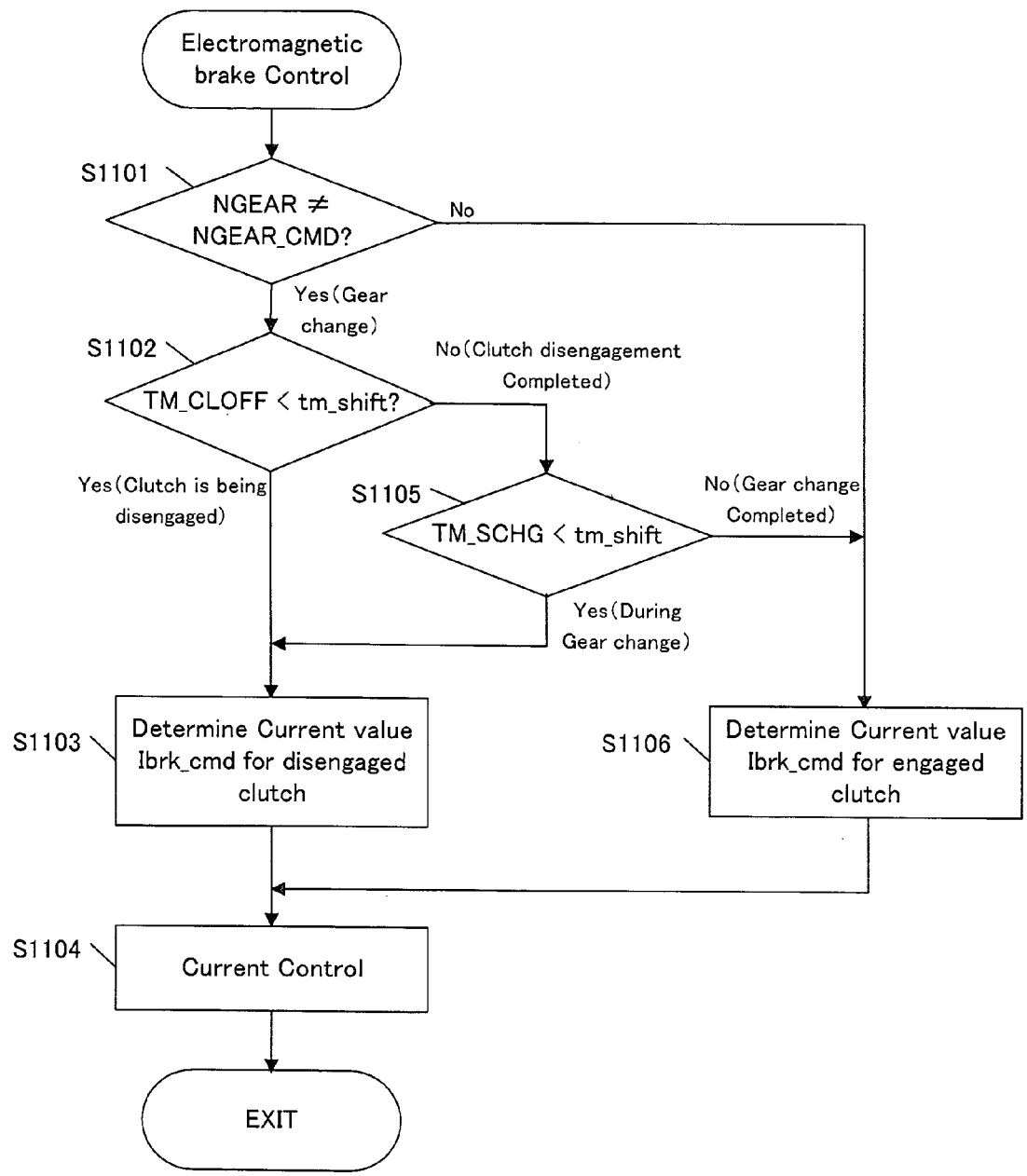
FIG. 11 is a flowchart of an electromagnetic brake control process in accordance with one embodiment of the present invention.
Figure 12:
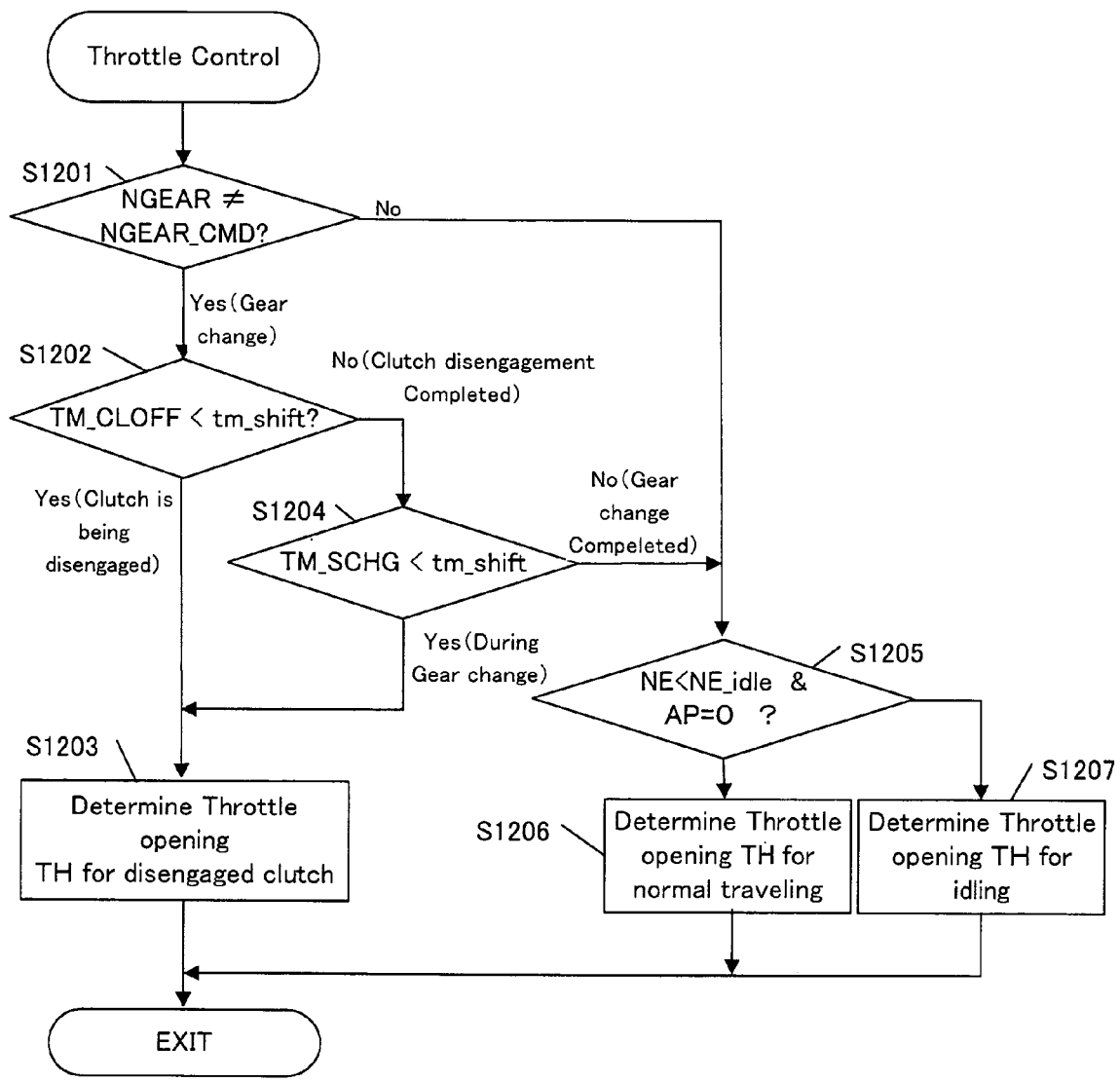
FIG. 12 is a flowchart of a throttle control process in accordance with one embodiment of the present invention.
Figure 13:
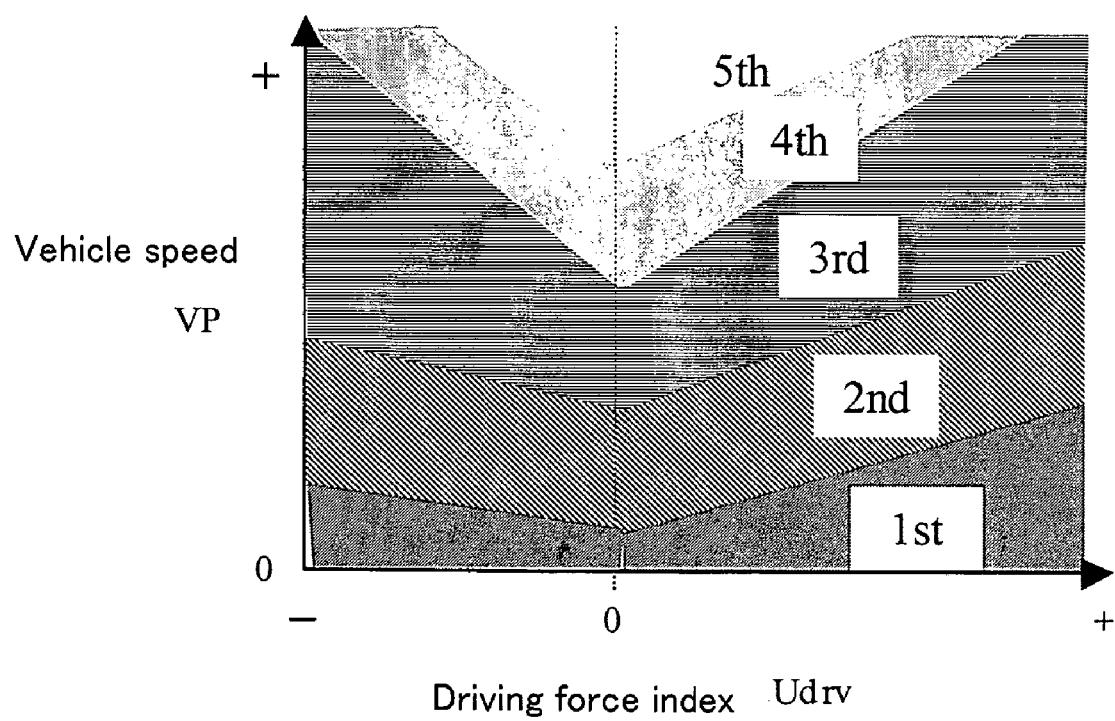
FIG. 13 shows a desired gear selection value map in accordance with one embodiment of the present invention.

Next, the ECU 100 performs the clutch control process (FIG. 10). This process is a process for determining a position of the clutch that transmits the power between the engine and the transmission and then controlling engagement/disengagement of the clutch based on the determined clutch position.

When the clutch control process is invoked, the ECU 100 determines whether or not the gear selection value NGEAR is different from the desired gear selection value NGEAR_CMD (S1001). If the gear selection value NGEAR is equal to the desired gear selection value NGEAR_CMD, the gear change is not required. The ECU 100 determines a desired clutch position value Cl_cmd (S1006). Here, partial clutch engagement may be needed when the vehicle is traveling. Such a partial clutch engagement position can be included in step 1006. When a creep travel is required, it is preferable to travel more smoothly. Therefore, in a creep travel, the power transmission is performed through the bypass path (that is, a path through the planetary gear mechanism controlled by the electromagnetic brake).

Figure 14:
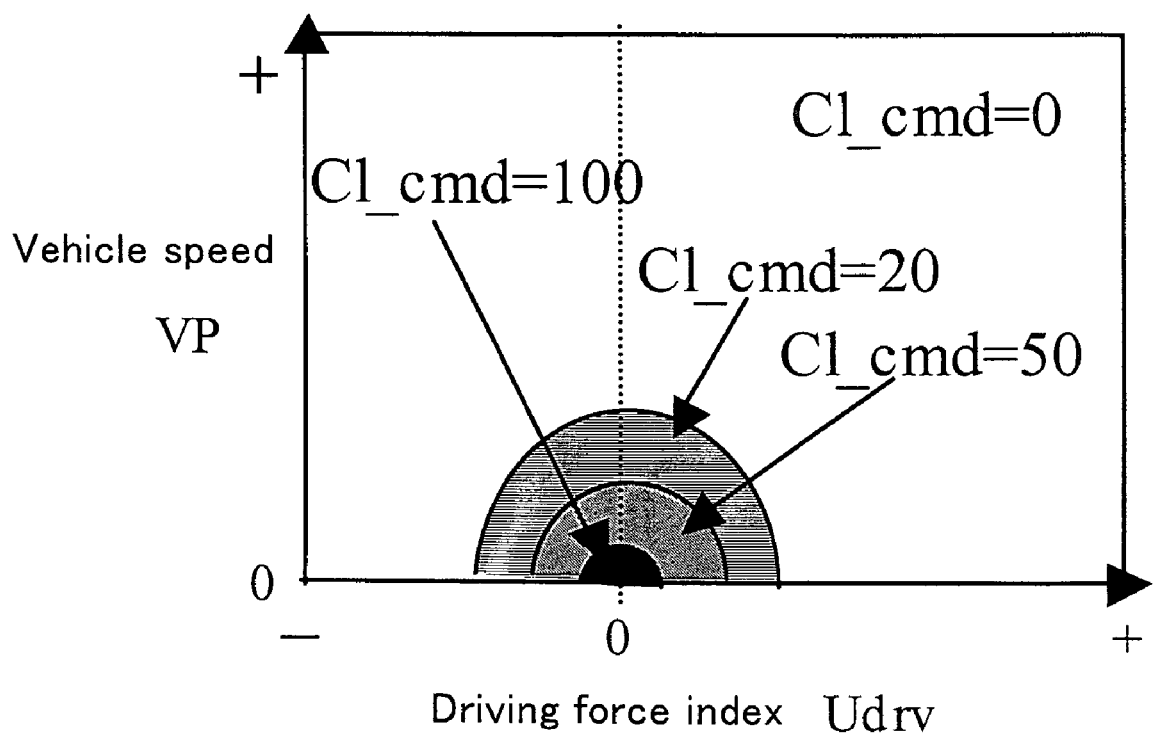
FIG. 14 shows a desired clutch position value map in accordance with one embodiment of the present invention.
Figure 15:
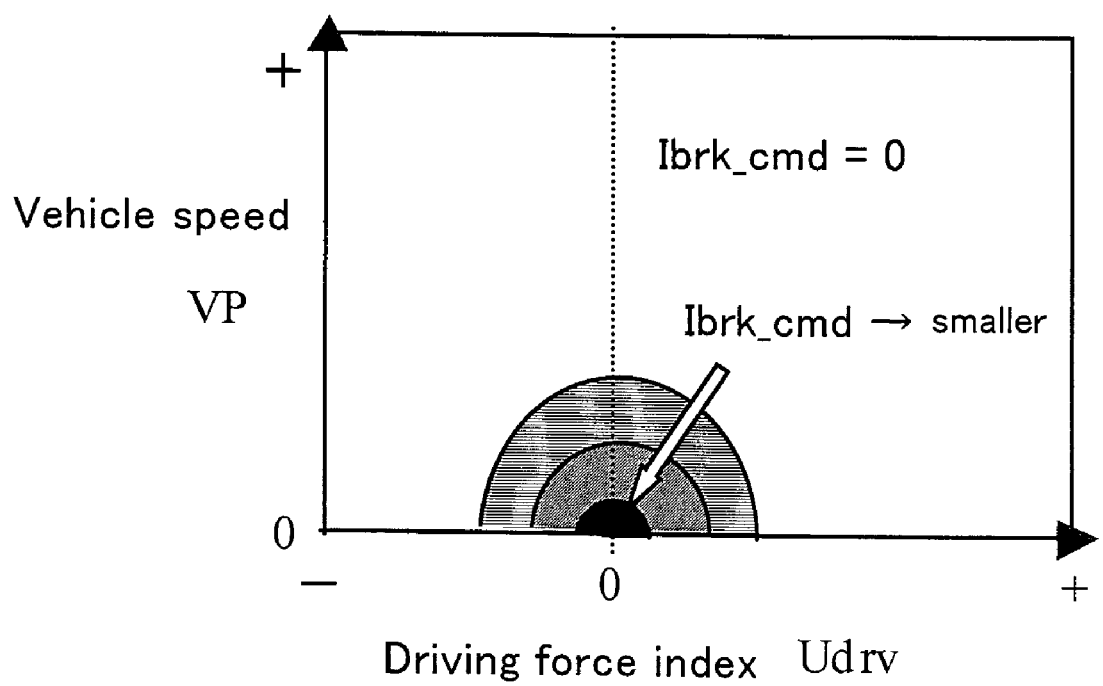
FIG. 15 shows a desired electric current value map for a normal travel in accordance with one embodiment of the present invention.
Figure 16:
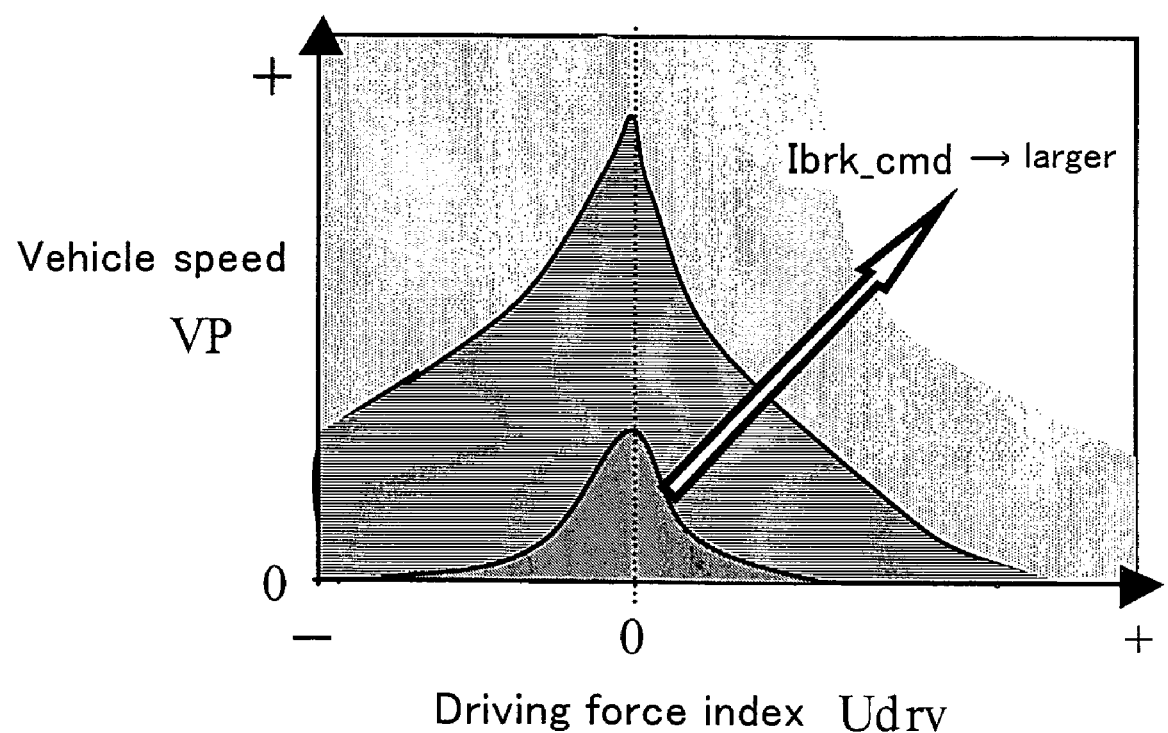
FIG. 16 shows a desired electric current value map for a gear change operation in accordance with one embodiment of the present invention.
Figure 17:
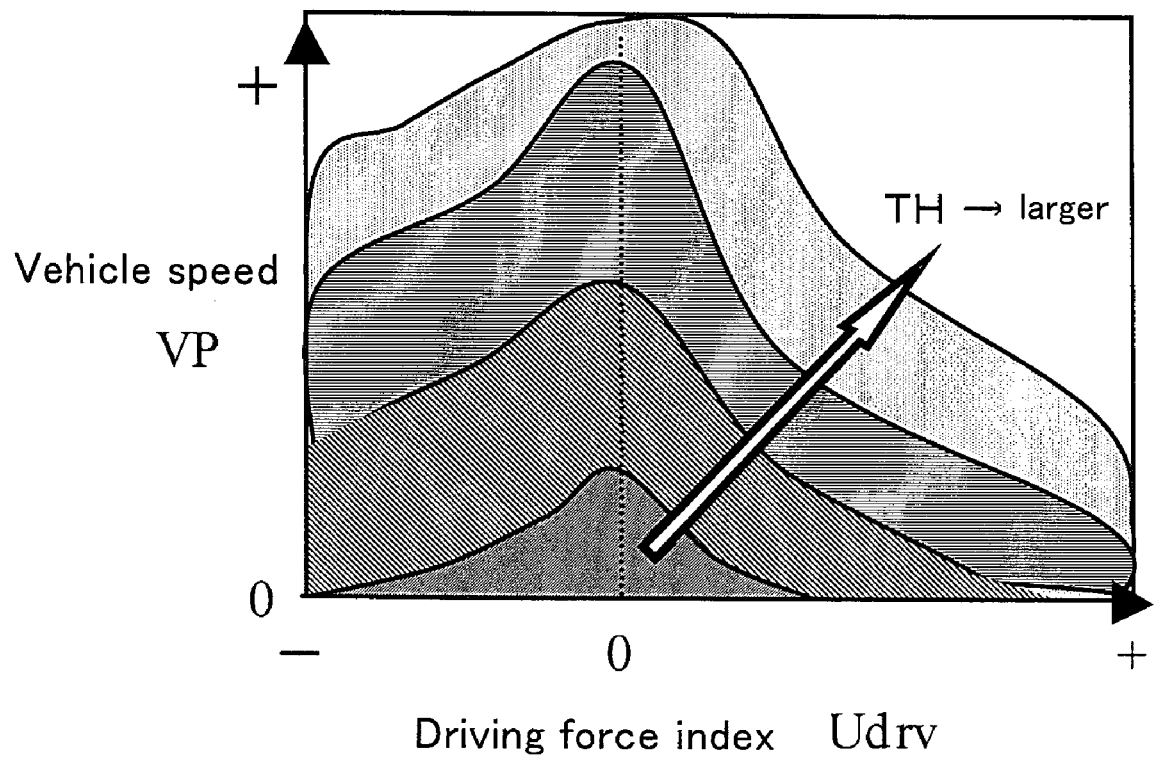
FIG. 17 shows a throttle opening map for a normal travel in accordance with one embodiment of the present invention.
Figure 18:
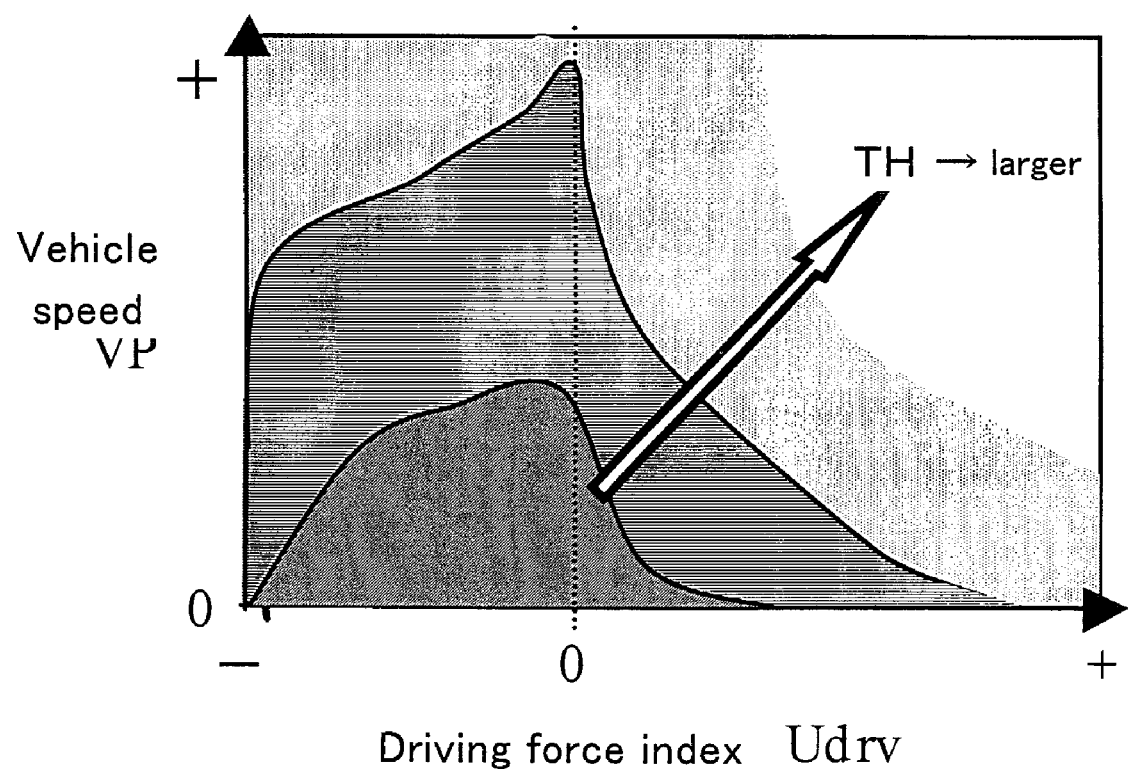
FIG. 18 shows a throttle opening map for a gear change in accordance with one embodiment of the present invention.

Specifically, the ECU 100 refers to a desired clutch position value map (FIG. 14) based on the driving force index Udrv and the vehicle speed VP stored in a memory to determine a clutch position desired value Cl_cmd. As shown in FIG. 14, the clutch position desired value map is established taking into account a creep travel (that is, travel at an extremely-low speed). In this map, a clutch release (that is, Cl_cmd is 100) is defined for a situation where the vehicle speed is low or no driving force is requested. The clutch is engaged as the driving force index increases.

Next, the clutch control is performed by using the above-described 2-degree-of-freedom response assignment control (S1004). Specifically, the equations (1-1) through (1-5) are used to determine the voltage (control input) Vcl. Then, this voltage is applied to the electric actuator of the clutch position control device 131 to perform the clutch control.

On the other hand, in S1001, if the gear selection value NGEAR is different from the desired gear selection value NGEAR_CMD, the gear change is required. In step S1002, the ECU 100 determines whether or not the gear change reference timer tm_shift is greater than the clutch-off period TM_CLOFF (200 ms in this embodiment). If the gear change reference timer tm_shift is not greater than the clutch-off period TM_CLOFF, it indicates that the clutch is being disengaged. The ECU 100 sets the desired clutch position value Cl_cmd to 100 so as to release the clutch (S1003).

The clutch position having a value of 100 indicates a state where the clutch is completely (100%) slipping. In other words, the clutch is completely disengaged. In contrast, the clutch position having a value of 0 indicates a state where there is no slipping in the clutch. That is, the clutch is completely engaged.

Next, the voltage Vcl is determined by using the equations (1-1) through (1-5). Then, the determined voltage is applied to the electric actuator of the clutch position control device 131 to perform the clutch control (S1004).

On the other hand, in step S1002, if the gear change reference timer tm_shift is greater than the clutch-off period TM_CLOFF, the ECU 100 determines whether or not the gear change reference timer tm_shift is greater than a gear change period TM_SCHG (S1005). If the gear change reference timer tm_shift is greater than the clutch-off period TM_CLOFF, it indicates that the gear change is being performed. The process proceeds to step S1003.

In step S1005, if the gear change reference timer tm_shift is not greater than the gear change period TM_SCHG, the ECU 100 refers to the desired clutch position value map (FIG. 14) based on the driving force index Udrv and the vehicle speed VP to determine the desired clutch position value Cl_cmd (S1006). Then, the clutch control as described above is performed (S1004). Then, this process is terminated.

When the clutch control process is finished, the electromagnetic brake control process is invoked. The electromagnetic brake control process is a process for performing a control for electromagnetically braking the planetary carrier.

When the electromagnetic brake control process is invoked, the ECU 100 determines whether or not the gear selection value NGEAR is different from the desired gear selection value NGEAR_CMD (S1101). If the gear selection value NGEAR is equal to the desired gear selection value NGEAR_CMD, the gear change is not required. The ECU 100 determines a desired electric current value Ibrk_cmd for the engaged clutch (S1106). Specifically, the ECU 100 refers to a desired electric current value map (FIG. 15), which is prepared for a normal travel, based on the driving force index Udrv and the vehicle speed VP stored in a memory to determine the desired electric current value Ibrk_cmd.

Next, the electric current control for the electromagnetic brake is performed by using the above-described 2-degree-of-freedom response assignment control (S1104). Specifically, the equations (2-1) through (2-5) are used to determine the voltage (control input) Vbrk. Then, the ECU sends a signal to the voltage control device 404 so as to apply this voltage to the exciting coil 403 of the electromagnetic brake 205. Thus, the electric current control of the electromagnetic brake is performed.

On the other hand, in step S1101, if the gear selection value NGEAR is different from the desired gear selection value NGEAR_CMD, the gear change is required. The ECU 100 determines whether or not the gear change reference timer tm_shift is greater than the clutch-off period TM_CLOFF (200 ms in this embodiment) (S1002). If the gear change reference timer tm_shift is greater than the clutch-off period TM_CLOFF, the clutch is being disengaged. The ECU 100 refers to a desired electric current value map (FIG. 16), which is prepared for traveling during a gear change, based on the driving force index Udrv the vehicle speed VP stored in a memory to determine an electric current desire value Ibrk_cmd for traveling during the gear change (S1103). The desired electric current value map for traveling during a gear change is established so that the desired value Ibrk_cmd becomes greater as the vehicle acceleration or the vehicle speed increases. This is because a deceleration feeling given to a driver due to a decrease in the driving force caused by a release of the clutch is larger as the vehicle acceleration or the vehicle speed becomes greater. Further, when a deceleration is large, a free-running feeling given to a driver due to a decrease in the engine brake force caused by a release of the clutch becomes larger. Accordingly, the desired value Ibrk_cmd is increased when the vehicle deceleration is large.

Next, the equations (2-1) through (2-5) are used to determine the voltage Vbrk (S1104). Then, the ECU sends a signal to the voltage control device 404 to apply this voltage to the exciting coil 403 of the electromagnetic brake 205. Thus, the electric current control for the electromagnetic brake is performed.

On the other hand, in S1102, if the gear change reference timer tm_shift is not greater than the clutch-off period TM_CLOFF, the ECU 100 determines whether or not the gear change reference timer tm_shift is greater than the gear change period TM_SCHG (S1105). If the gear change reference timer tm_shift is greater than the gear change period TM_SCHG, it indicates that the gear change is being performed. The process proceeds to step S1103.

In step S1105, if the gear change reference timer tm_shift is not greater than the gear change period TM_SCHG, the ECU 100 refers to the electric current desired value map for a normal travel (FIG. 15) based on the driving force index Udrv and the vehicle speed VP stored in a memory to determine the desired electric current value Ibrk_cmd (S1106). Then, the electric current control is performed by using the above-described equations (S1104).

Thus, the electromagnetic brake control is performed.

Next, a process for controlling the electronic throttle (FIG. 12) is invoked. According to one embodiment of the present invention, because the driving power is continuously transmitted to the counter shaft 214 even when a gear change is being performed, it is preferable that the engine rotational speed and engine output are controlled during the gear change. According to the throttle control, an appropriate engine output can be generated during the gear change.

When the throttle control process is invoked, the ECU 100 determines whether or not the gear selection value NGEAR is different from the desired gear selection value NGEAR_CMD (S1201). If the gear selection value NGEAR is different from the desired gear selection value NGEAR_CMD, the gear change is being performed. The ECU 100 determines whether or not the gear change reference timer tm_shift is greater than the clutch-off period TM_CLOFF (200 ms in this embodiment) (S1202). If the gear change reference timer tm_shift is greater than the clutch-off period TM_CLOFF, the ECU 100 sets a throttle opening degree TH (S1203). Specifically the ECU 100 refers to a throttle opening map (FIG. 18), which is prepared for a disengaged clutch, based on the driving force index Udrv and the vehicle speed VP stored in a memory to determine the throttle opening degree TH. The throttle opening map is established so that the throttle opening degree, which can compensate for the driving force, is greater with an increase in the vehicle acceleration or an increase in the vehicle speed because a deceleration feeling given to a driver due to a decrease in the driving force caused by a release of the clutch is larger as the vehicle speed becomes higher. When the vehicle speeds decreases, a free-running feeling given to a driver due to a decrease in the engine brake force caused by a release of the clutch is large. Accordingly, the throttle opening degree TH is controlled toward a closed state so that the engine brake is generated. When the vehicle speed is faster, the running resistance (for example, air resistance) increases. Therefore, the engine brake is decreased to compensate for the increase in the running resistance.

In S1202, if the gear change reference timer tm_shift is not greater than the clutch-off period TM_CLOFF, it indicates that engagement of the clutch is completed. The ECU 100 determines whether or not the gear change reference timer tm_shift is greater than the gear change period TM_SCHG (600 ms in this embodiment) (S1204). If the gear change reference timer tm_shift is greater than the clutch-off period TN_CLOFF, the process proceeds to step S1203.

In step S1204, if the gear change reference timer tm_shift is not greater than the gear change period TM_SCHG, the ECU 100 determines the engine rotational speed NE and obtains an accelerator pedal angle from the accelerator pedal sensor. The ECU 100 then determines whether or not the accelerator pedal is not depressed and the engine rotational speed is smaller than an idling threshold value (1100 rpm in this embodiment) (S1205). If the accelerator pedal is not depressed and the engine rotational speed is smaller than the idling threshold value, the ECU 100 determines that the engine is idling. The ECU 100 determines a throttle opening degree for idling (S1207). In this embodiment, the throttle opening degree for idling is predetermined.

In step S1205, if the accelerator pedal is depressed or the engine rotational speed is not smaller than the idling threshold value, the ECU 100 refers to a throttle opening map (FIG. 17), which is prepared for a normal travel, based on the driving force Udrv and the vehicle speed VP stored in a memory to determine the throttle opening degree TH (S1206).

In step S1201, if the gear selection value NGEAR is equal to the desired gear selection value NGEAR_CMD, the gear change is not required. The process proceeds to step S1205. Description of the process in step S1205 and subsequent steps will be omitted because it has been described above.

After the throttle opening degree TH is determined, this process is terminated. Then, the ECU 100 controls the VTC 105 through the VTC control solenoid 130 so that the amount of intake air corresponding to the throttle opening TH is introduced into the engine.

Thus, since the power from the engine can be transmitted to the axle shaft even when the clutch is in a released state, interruption of the driving for during a gear change operation can be avoided and hence drivability during the gear change is improved. It should be noted that, in the present invention, if a failure occurs in the transmission, the electromagnetic brake may be activated to enable a fail-safe travel. If a failure occurs in the electromagnetic brake, the clutch may be controlled so as to enable a creep travel.

What is claimed is:

1. A transmission comprising:
   a first transmission mechanism for changing a gear ratio between an engine and an axle shaft;
   a clutch for engaging and disengaging transmission of a driving force from the engine to the first transmission mechanism;
   a second transmission mechanism provided between the engine and the axle shaft; and
   an electromagnetic brake connected to the second transmission mechanism, the electromagnetic brake generating a braking force in response to application of electricity, the braking force allowing the second transmission mechanism to transmit a driving force from the engine to the axel shaft when the clutch is disengaged.

2. The transmission of claim 1, wherein the second transmission mechanism comprises a planetary gear,
   wherein the braking force is applied to the planetary gear to allow the transmission of a driving force by the second transmission mechanism.

3. The transmission of claim 2, wherein the planetary gear includes a sun gear, a plurality of planetary pinions, a carrier for interconnecting the plurality of planetary pinions, and a ring gear, the carrier connected to the electromagnetic brake;
   wherein the braking force restricts a rotation of the carrier to allow the transmission of a driving force by the second transmission mechanism.

4. The transmission of claim 1, wherein the transmission of a driving force by the second transmission mechanism is performed when creep travel is required.

5. The transmission of claim 1, wherein the braking force generated by the electromagnetic brake is determined in accordance with at least one of a vehicle speed and a requested driving force.

6. The transmission of claim 1, wherein the braking force generated by the electromagnetic brake is controlled by controlling electric current flowing into an electromagnetic coil of the electromagnetic brake to a desired value.

7. The transmission of claim 6, wherein the control of the electric current is performed by a 2-degree-of-freedom response assignment control.

8. The transmission of claim 7, wherein control of the engagement/disengagement of a driving force by the clutch is performed by the 2-degree-of-freedom response assignment control;
   wherein assignment of a response characteristic to a desired value is the same for both of the control for the electric current and the control for the engagement/disengagement of a driving force by the clutch.

9. A method for switching a transmission path of a driving force from an engine, comprising:
   if a clutch is in an engaged state, transmitting a driving force from the engine to an axle shaft through a first path; and
   if the clutch is in a disengaged state,
   generating a braking force;
   activating a second path by the braking force; and
   transmitting a driving force from the engine to the axle shaft through the second path.

10. A method of claim 9, wherein the second path extends from the engine, through a planetary gear, to the axle shaft;
    wherein the method further comprises applying the braking force to the planetary gear to allow the transmission of a driving force through the second path.

11. The method of claim 10, wherein the planetary gear includes a sun gear, a plurality of planetary pinions, a carrier for interconnecting the plurality of planetary pinions, and a ring gear;
    wherein the method further comprises applying the braking force to the carrier to restrict a rotation of the carrier.

12. The method of claim 9, further comprising transmitting a driving force through the second path when a creep travel is required.

13. The method of claim 9, further comprising determining the braking force in accordance with at least one of a vehicle speed and a requested driving force.

14. The method of claim 9, further comprising controlling the braking force by controlling electric current to a desired value, the electric current flowing into an electromagnet from which the braking force is generated.

15. The method of claim 14, further comprising controlling the electric current by a 2-degree-of-freedom response assignment control.

16. The method of claim 15, further comprising controlling the engagement/disengagement of the clutch by the 2-degree-of-freedom response assignment control;
    wherein assignment of a response characteristic to a desired value is the same for both of the control for the electric current and the control for the engagement/disengagement of a driving by the clutch.

17. A transmission comprising:
    a first transmission means for transmitting a driving force from an engine through a clutch to an axle shaft when the clutch is in an engaged state;
    a second transmission means for transmitting a driving force from the engine to the axle shaft, not through the clutch, when the clutch is in a disengaged state;
    an electromagnetic braking means for generating an electromagnetic braking force; and
    a control means for activating the electromagnetic braking means if the clutch is disengaged, the braking force generated by the braking means allowing the transmission of a driving force by the second transmission means.

18. The transmission of claim 17, wherein the second transmission means includes:
    a bypass shaft connected between the engine and a planetary gear means; and
    the planetary gear means connected to the axel shaft;

wherein the braking force is applied to the planetary gear means so that the driving force from the engine is transmitted to the axel shaft through the bypass shaft.

19. The transmission of claim 17, wherein the braking force is applied to a carrier of the planetary gear means to brake a rotation of the carrier, wherein the driving force from the bypass shaft is transmitted to the axel shaft through a rotation of planetary pinions interconnected by the carrier thus braked.

20. The transmission of claim 17, wherein the bypass shaft is different from a shaft through which a driving force is transmitted to the axle shaft by the first transmission means and to which a plurality of gears are attached for implementing a gear change operation by the first transmission means.

* * * * *